United States Patent
Dilworth et al.

(10) Patent No.: US 9,770,956 B2
(45) Date of Patent: Sep. 26, 2017

(54) AXLE BRACKET LINER

(71) Applicants: Damon E. Dilworth, Channahon, IL (US); Michael P. Bloink, Romeoville, IL (US); Matthew E. M. DiCianni, Mokena, IL (US); Matthew J. Van Meter, Plainfield, IL (US)

(72) Inventors: Damon E. Dilworth, Channahon, IL (US); Michael P. Bloink, Romeoville, IL (US); Matthew E. M. DiCianni, Mokena, IL (US); Matthew J. Van Meter, Plainfield, IL (US)

(73) Assignee: HENDRICKSON USA L.L.C., Itasca, IL (US)

( * ) Notice: Subject to any disclaimer, the term of this patent is extended or adjusted under 35 U.S.C. 154(b) by 27 days.

(21) Appl. No.: 14/663,778

(22) Filed: Mar. 20, 2015

(65) Prior Publication Data

US 2016/0272027 A1 Sep. 22, 2016

(51) Int. Cl.
*B60G 9/00* (2006.01)
*B60G 11/113* (2006.01)
*F16M 13/02* (2006.01)

(52) U.S. Cl.
CPC ............ *B60G 11/113* (2013.01); *B60G 9/003* (2013.01); *F16M 13/02* (2013.01); *B60G 2204/4306* (2013.01)

(58) Field of Classification Search
CPC ...... B60G 9/003; B60G 9/027; B60G 11/113; F16F 1/26
USPC .............. 248/220.22; 180/905; 267/52, 229; 280/144, 156, 124.7, 124.175
See application file for complete search history.

(56) References Cited

U.S. PATENT DOCUMENTS

| | | | |
|---|---|---|---|
| 1,189,590 A | 7/1916 | Loomis | |
| 3,630,541 A * | 12/1971 | Carlson | B60G 9/003 267/256 |
| 4,371,190 A | 2/1983 | Vandenberg | |
| 5,078,420 A | 1/1992 | Jable et al. | |
| 5,328,159 A * | 7/1994 | Kaufman | B60G 11/113 267/52 |
| 5,476,251 A | 12/1995 | Moses et al. | |
| 5,921,570 A * | 7/1999 | Lie | B60G 9/00 267/52 |
| 6,406,008 B1 | 6/2002 | Dudding et al. | |
| 2004/0140373 A1 | 7/2004 | Joseph et al. | |

(Continued)

OTHER PUBLICATIONS

International Search Report and Written Opinion for PCT/US2016/020064 dated May 5, 2016.
Drawing—prior art to U.S. Appl. No. 14/663,778 (Date Unknown).

*Primary Examiner* — Anita M King
(74) *Attorney, Agent, or Firm* — Cook Alex Ltd.

(57) ABSTRACT

Liner assemblies for axle brackets of axle coupling assemblies are disclosed. The liner assemblies include a body having an elongated base and at least one extension member having a connector. Liner assembly and axle bracket combinations and method of connecting liner assemblies to axle brackets also are disclosed, with the liner assemblies including a body having an elongated base and at least one extension member having at least one connector, with the axle brackets including a body having a central portion and including at least one connector receiver configured to receive the at least one connector of the at least one extension member of the liner assemblies.

20 Claims, 12 Drawing Sheets

(56) References Cited

U.S. PATENT DOCUMENTS

2009/0256328 A1 10/2009 Dudding et al.
2014/0035250 A1 2/2014 Dilworth at al.
2014/0259626 A1 9/2014 Dilworth

* cited by examiner

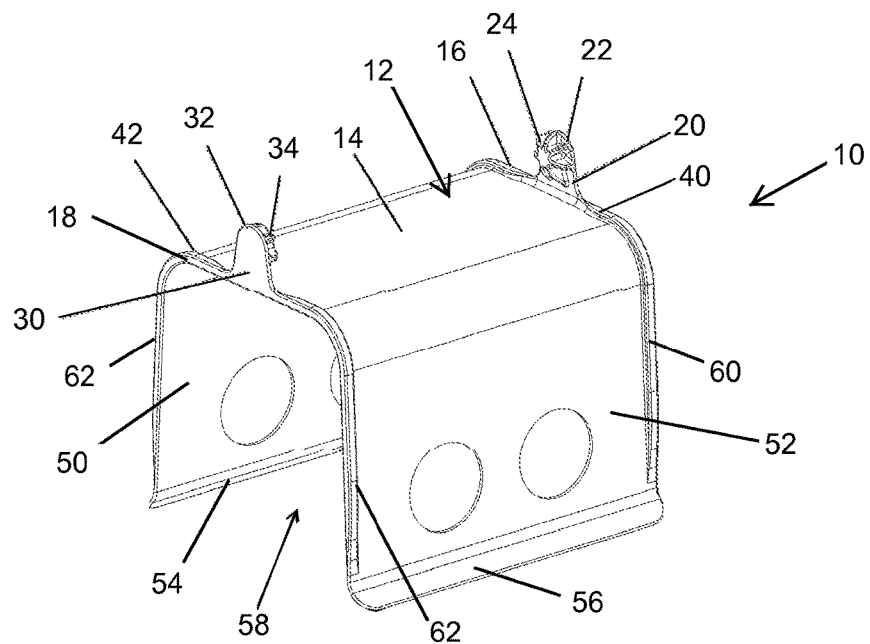
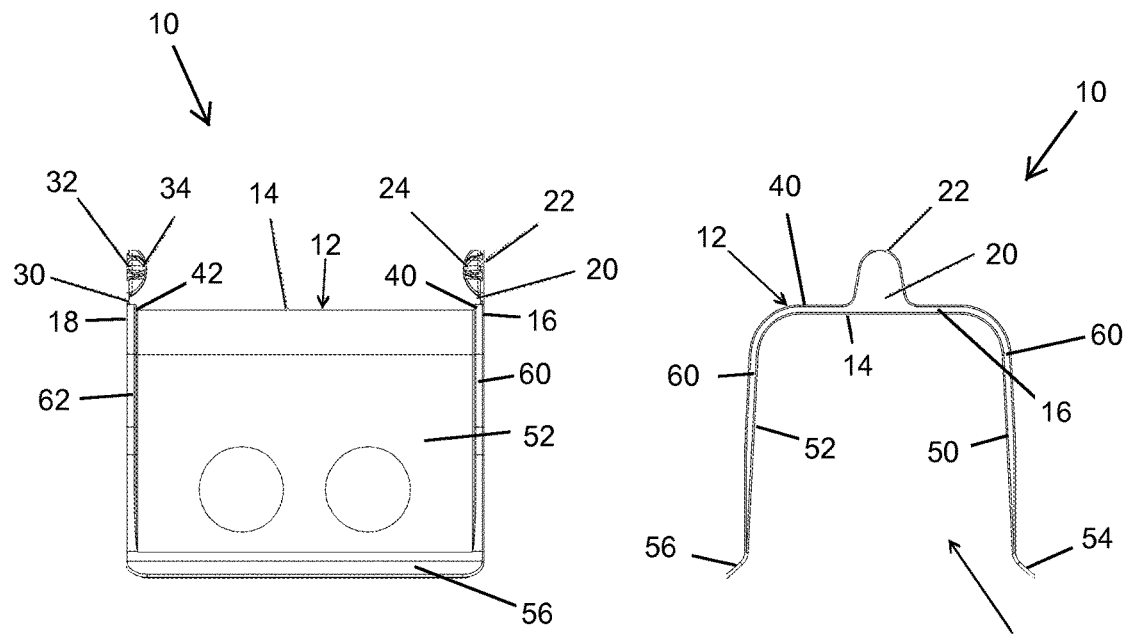
FIG. 1
FIG. 2
FIG. 3

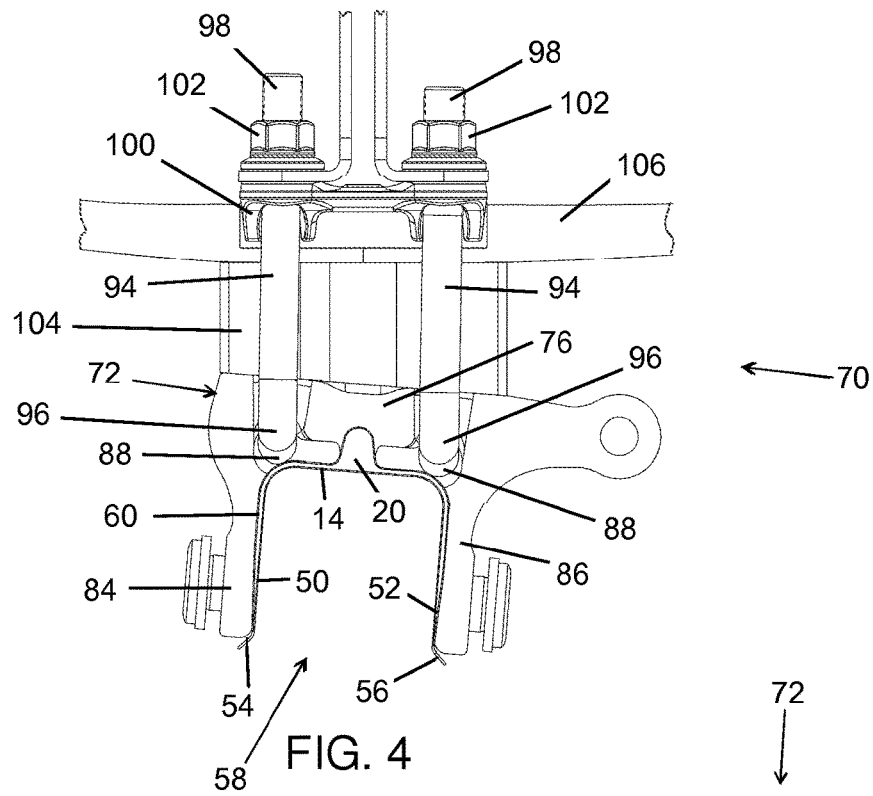
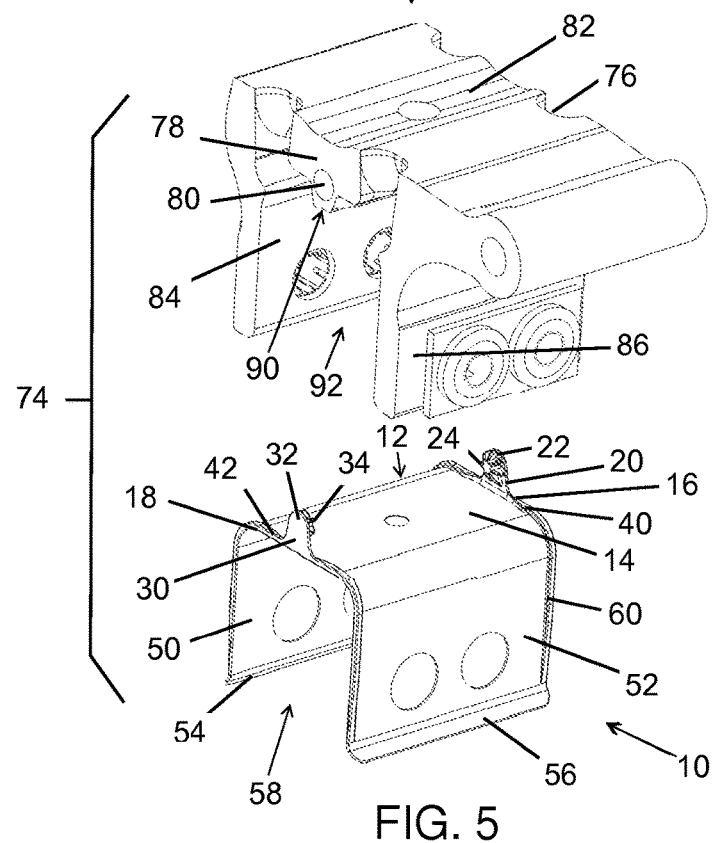

AXLE BRACKET LINER

BACKGROUND

Field of the Invention

The present invention generally relates to axle coupling assemblies for suspension systems, and more particularly to liner assemblies for axle brackets.

Discussion of the Prior Art

Wheeled vehicles commonly have suspension systems that utilize axle coupling assemblies to couple an axle to a leaf spring or other suspension components, which in turn, are attached to a frame or directly to a body assembly. When coupling an axle coupling assembly to an axle, a liner assembly, which also may be referred to as a bushing assembly, may be used between components for various reasons, such as to accommodate dimensional tolerances, to isolate vibration, to separate dissimilar materials to avoid corrosion or for other purposes, as desired.

Use of a liner assembly when coupling an axle coupling assembly to an axle typically requires transportation of the liner assemblies to the location where the axle coupling assembly will be coupled to the axle, and separately stocking the liner assemblies until they are called for in the final installation. Final installation requires a liner assembly to be placed on an axle or between an axle and an axle bracket, and then the securing the axle bracket of the axle coupling assembly to the axle. Unfortunately, an operator may inadvertently forget to install the liner assembly, which may lead to a need to subsequently reverse the installation process to permit proper installation of the liner assembly. Also, the liner assembly may move or shift during installation, requiring extra time and effort of an operator to properly align the components before completing the installation. Thus, while liner assemblies may play an important role in coupling an axle coupling assembly to an axle, there can be challenges associated with the need to separately stock and properly install the liner assemblies.

The present disclosure addresses shortcomings found in prior art liner assemblies that are used in coupling an axle coupling assembly to an axle and in the methods of installation that are commonly used.

SUMMARY

The purpose and advantages of the disclosed subject matter will be set forth in and apparent from the description and drawings that follow, as well as will be learned by practice of the claimed subject matter. While example liner assemblies for axle brackets for an axle coupling assembly of a suspension system and methods of their installation are shown within the present disclosure, it will be understood that the structures and principles of operation also may be utilized with alternative liner assemblies and axle bracket constructions and configurations.

This disclosure is directed to liner assemblies for use in axle coupling assemblies that will be coupled to an axle. The liner assemblies include at least one connector by which the liner assemblies may be pre-assembled to axle brackets of axle coupling assemblies prior to transporting the axle coupling assemblies to the location where they will be coupled to axles. The ability to pre-assemble a liner assembly to an axle bracket reduces the time and effort required during final coupling of an axle coupling assembly to an axle, at least in part by eliminating the potential for inadvertent omission of the liner assembly, as well as movement or misalignment of the liner assembly. Pre-assembly of the liner assembly to an axle bracket within an axle coupling assembly also reduces the need for separate shipping and space to stock the liner assemblies near the location of final assembly to an axle, and the inventory management associated therewith. In some configurations, for instance with the example axle brackets of axle coupling assemblies shown herein, the liner assembly may provide additional benefits, such as helping to retain or protect components during coupling of an axle to an axle coupling assembly.

In a first aspect, disclosed herein is a liner assembly for an axle bracket of an axle coupling assembly. The liner assembly includes a body having an elongated base and at least one extension member comprising a connector.

In a second aspect, disclosed herein is a liner assembly and axle bracket combination. The liner assembly includes a body having an elongated base and at least one extension member comprising at least one connector. The axle bracket includes a body having a central portion, and the axle bracket further includes at least one connector receiver configured to receive the at least one connector of the at least one extension member of the liner assembly.

In a third aspect, disclosed herein is method of connecting a liner assembly to an axle bracket. The method includes holding an axle bracket having a body that includes a central portion and at least one connector receiver. The method further includes holding a liner assembly having an elongated base and at least one extension member that includes at least one connector. The method further includes moving the liner assembly to position the elongated base adjacent the central portion of the axle bracket and wherein the at least one connector receiver on the axle bracket receives the at least one connector of the liner assembly.

It is to be understood that both the foregoing general description and the following detailed description are exemplary and provided for purposes of explanation only, and are not restrictive of the subject matter claimed. Further features and objects of the present disclosure will become more apparent in the following description of example embodiments and from the appended claims.

BRIEF DESCRIPTION OF THE DRAWINGS

In describing the preferred examples, reference is made to the accompanying drawing figures wherein like parts or features have like reference numerals, and wherein:

FIG. 1 is an upper front perspective view of an example liner assembly for an axle bracket of an axle coupling assembly.

FIG. 2 is side view of the example liner assembly of FIG. 1.

FIG. 3 is an end view of the example liner assembly of FIG. 1.

FIG. 4 is a partial end view of an axle coupling assembly showing the example liner assembly of FIG. 1 connected to an axle bracket of an axle coupling assembly.

FIG. 5 is an exploded, upper front perspective view of the example liner assembly of FIG. 1 and the axle bracket of the axle coupling assembly of FIG. 4.

Figure 6:
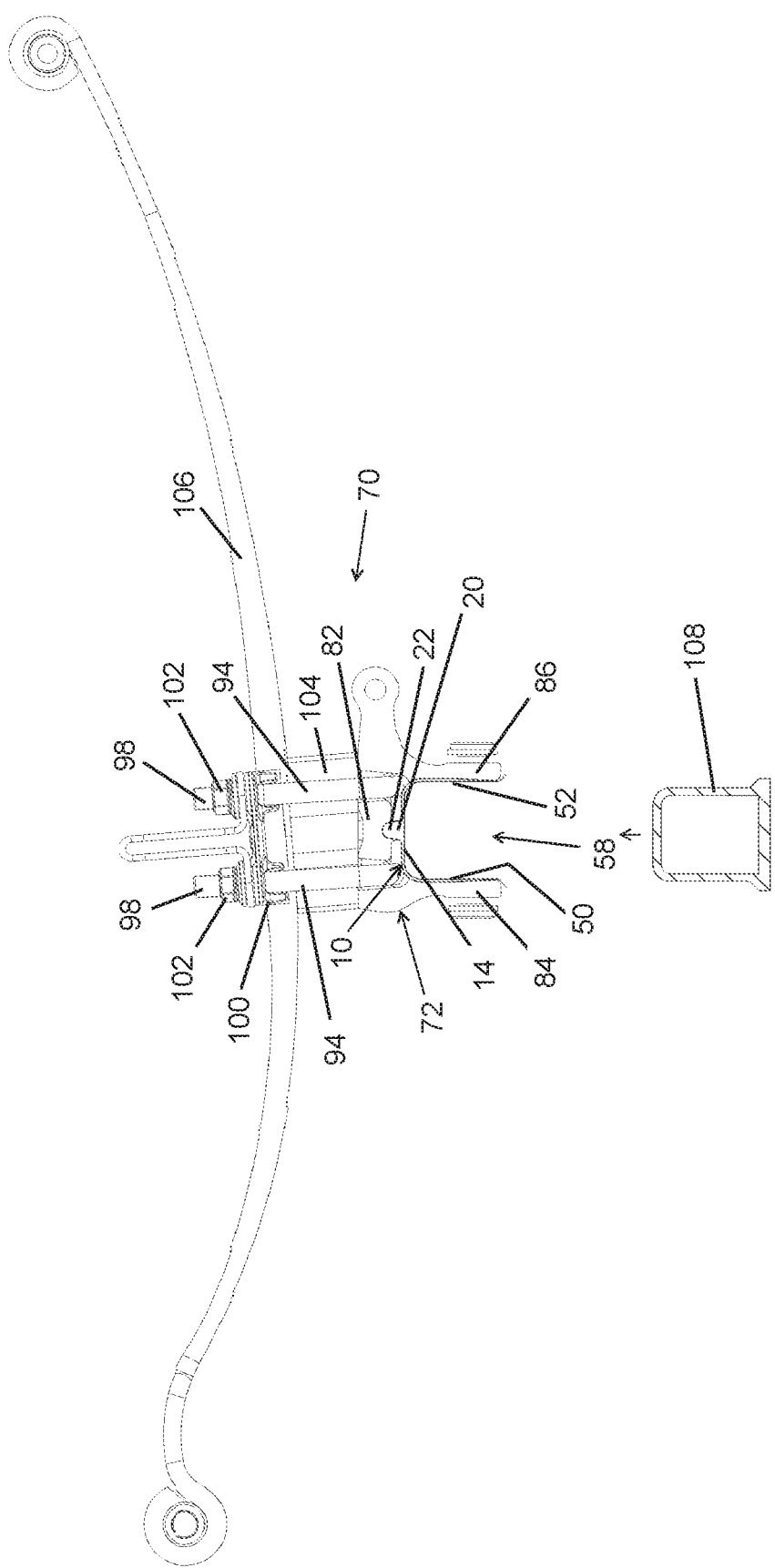
FIG. 6 is a partially exploded end view showing the complete assembly of FIG. 4 and a cross-section of an axle to which the axle coupling assembly may be coupled.

It should be understood that the drawings are not to scale. While some mechanical details of example liner assemblies for suspension systems and axle coupling assemblies, including other plan and section views of the examples shown, have not been included, such details are considered within the comprehension of those of skill in the art in light of the present disclosure. It also should be understood that the present disclosure is not limited to the preferred example illustrated.

DETAILED DESCRIPTION OF THE PREFERRED EMBODIMENTS

For the following defined terms, these definitions shall be applied, unless a different definition is given in the claims or elsewhere in this disclosure. As used in this disclosure and the appended claims, the singular forms "a", "an", and "the" include plural referents unless the content clearly dictates otherwise. As used in this disclosure and the appended claims, the term "or" is generally employed in its sense including "and/or" unless the content clearly dictates otherwise.

Referring generally to FIGS. 1-17, it will be appreciated that liner assemblies for axle brackets of the present disclosure generally may be embodied within numerous configurations, and may be used in various ways within an axle coupling assembly that is to be coupled to an axle.

Turning to FIG. 1, a first example liner assembly 10 of this disclosure is shown. The liner assembly 10 has a body 12, which includes an elongated base 14 and at least one extension member 20. In this example, the elongated base has a first end 16 and a second end 18, and the extension member 20 extends from the first end 16. The extension member 20 has a connector 22. It will be appreciated that the connector 22 may include a protrusion 24 and that the protrusion may have a self-centering shape. For instance, the self-centering shape shown in this example is a hemispheric finned or star shape, but it will be appreciated that alternative connector shapes may be used, and that suitable self-centering shapes generally will tend to be tapered from a narrower or smaller top to a broader or larger bottom. It also will be appreciated that alternative configurations may be utilized, such as if the extension member were to extend directly upward from a central portion of the elongated base, and that it may include a connector in the form of a protrusion that may be received by a recess in a surface that would be adjacent to the elongated base when the liner assembly is installed. Still further, the connector of the liner assembly may comprise an aperture that would be received over a protrusion on the axle bracket to which the liner assembly would be connected. In this sense, an aperture may be self-centering if a connector receiver on an axle bracket is configured to receive the aperture over a protrusion having a tapered configuration.

Referring again to the example shown in FIG. 1, the body 12 of the liner assembly 10 may further include at least a second extension member 30 that may have a connector 32. The second extension member 30 may extend from the second end 18 of the elongated base 14. The connector 32 may be similar to the connector 22, as is shown in this example, where the connector 32 includes a protrusion 34 having a self-centering shape, but faces in a direction opposite to that of the connector 22. Thus, in this example, the extension members 20, 30 are located at respective opposed first and second ends 16, 18 of the elongated base 14, and the connectors 22, 32 extend toward each other, which happens to be in a manner that is generally parallel to the elongated base 14.

In the first example shown in FIG. 1, the extension members 20, 30 are configured to deflect or bend. Indeed, the connectors 22, 32 are configured to cause the at least two extension members 20, 30 to deflect outward, in opposed directions when the liner assembly 10 is being connected to an axle bracket 72. It will be appreciated that the self-centering shape of the protrusions 24, 34 of the connectors 22, 32 will tend to cause the upstanding members 20, 30 to increasingly deflect as the protrusions encounter and move over an interference from their broader base to narrower top. Similarly, if the connectors on the extension members of the liner assembly were apertures and an axle bracket included connector receivers having a tapered protrusion shape, the connectors or the liner assembly would be self-centering.

The elongated base 14 of the body 12 of this example may include a first locating member 40 that may, for instance, have an upstanding edge or lip at the first end 16 of the elongated base 14. The locating member 40 allows the liner assembly 10 to be quickly located relative to an axle bracket for assembly, as will be described further herein. The elongated base 14 may include a second locating member 42 that may, for example, have an upstanding edge or lip at the second end 18 of the elongated base 14. As will be explained further below, it will be appreciated that the locating members 40, 42 allow an operator to positively locate the liner assembly 10 relative to an axle bracket and that the locating members 40, 42 provide a retention feature that will help assure that the liner assembly 10 will not shift or move from its installed position after an axle coupling assembly has been coupled to an axle.

As seen in the example shown in FIG. 1, the body 12 of the liner assembly 10 may further include two side walls 50, 52 extending from the elongated base 14. The two side walls 50, 52 may include distal portions 54, 56 that are flared outward relative to the side walls 50, 52 and provide an entry to an axle receiving space 58 between the side walls 50, 52. The two side walls 50, 52 may extend from the elongated base 14 in a direction opposite the at least one extension member 20. For instance, as shown, the side walls 50, 52 extend downward while the upstanding member 20 extends upward. However, it will be understood that words implying an orientation, such as "upward", "downward", "upstanding" or "depending", as used in describing the example shown, are not intended to be limiting. Indeed, the position of various components may be inverted or otherwise oriented when designing or using a suspension system, such that, for instance, an axle may be located above or below a spring assembly, and an axle bracket may receive an axle from a direction that is above, below, forward or rearward of the axle bracket.

To further assist in locating a liner assembly 10 during installation and to help keep the liner assembly in position during operation of the fully assembled suspension, the side walls 50, 52 may have a first locating member 60 further including an upstanding edge or lip at a first end of the side walls. The side walls 50, 52 also may have a second locating member 62 further including an upstanding edge or lip at a second end of the side walls. Thus, while locating members at the ends of an elongated base may be sufficient to assist in positively locating a liner assembly during installation and use of the suspension, it will be appreciated that if it is desired to have the liner assembly include side walls, then inclusion of locating members on the side walls may further assist in positively locating the liner assembly during installation and use.

It will be understood that the liner assemblies may be constructed of many different materials, including various grades or formulations of Nylon, rubber, plastics, alloys, metals, composites, resins or the like. Depending on the materials and configurations, components of the liner assemblies also may be manufactured in various ways, such as by injection molding, extrusion, stamping or other suitable manufacturing methods, and components of the liner assemblies may be separately formed and then joined or may be integrally formed from one material and as one continuous piece.

Turning to FIGS. 4-6, an example is shown that includes a liner assembly and axle bracket combination. For example, FIG. 4 shows an enlarged view of an axle coupling assembly 70 having the example liner assembly 10 connected to an example axle bracket 72. FIG. 5 provides an exploded view that isolates the assembly of the liner assembly 10 and the axle bracket 72. FIG. 6 shows the axle coupling assembly 70 above an example axle 108 to which it may be coupled for use in a vehicle.

From FIGS. 1-6, it will be appreciated that a liner assembly and axle bracket combination 74 is disclosed as including a liner assembly 10 having a body 12 including an elongated base 14 that includes at least one extension member 20 that has at least one connector 22. The assembly 74 further includes the axle bracket 72 having a body having a central portion 82 and at least one connector receiver 80 configured to receive the at least one connector 22 of the at least one extension member 20 of the liner assembly 10. In the example shown, it will be appreciated that the liner assembly 10 includes at least a second extension member 30 having a connector 32, and the axle bracket 72 further includes at least a second connector receiver to receive the connector 32 on the at least second extension member 30. Indeed, the liner assembly 10 is shown with at least two extension members 20, 30 at opposed ends 16, 18 of the elongated base 14, and each extension member 20, 30 further includes a connector 22, 32, respectively. The central portion 82 of the axle bracket 72 has opposed ends 76, 78, which further include connector receivers 80 configured to receive the connectors 22, 32 of the extension members 20, 30 of the liner assembly 10.

The extension members of the liner assembly of the example liner assembly and axle bracket combination may be configured to deflect when the liner assembly is being connected to the axle bracket. Indeed, in the example shown, the extension members 20, 30 deflect as the liner assembly 10 is moved to a position where the connector receivers 80 on the opposed ends 76, 78 of the axle bracket 72 receive the connectors 22, 32. Thus, it will be understood when viewing FIG. 5 that a method of connecting a liner assembly to an axle bracket may include holding an axle bracket 72 having a body that includes a central portion 82 and at least one connector receiver 80, holding a liner assembly 10 having an elongated base 14 and at least one extension member 20 that includes a connector 22, and moving the liner assembly 10 to position the elongated base 14 adjacent the central portion 82 of the axle bracket 72, and wherein the connector receiver 80 on the axle bracket 72 receives the at least one connector 22 on the liner assembly 10. Thus, as the liner assembly 10 is moved into position to be connected to the axle bracket 72, the connector 22 will engage the end 76 of the axle bracket 72. This will force the extension members 20 to deflect or bend until the liner assembly 10 is moved to a position wherein the protrusion 24 of the connector 22 is received by the connector receiver 80 on the axle bracket 72. This provides a self-securing feature and the connector 22 may be configured to snap into position with the connector receiver 80, or to be pressed into engagement with the connector receiver 80.

The liner assembly 10 may include at least two extension members 20, 30, with each extension member having at least one connector 22, 32, respectively, while the axle bracket 72 may include at least two connector receivers 80. The moving of the liner assembly 10 to position the elongated base 14 of the liner assembly 10 adjacent the central portion 82 of the axle bracket 72 then causes the at least two connector receivers 80 on the axle bracket 72 to receive the respective at least two connectors 22, 32 on the liner assembly 10. For instance, in the example shown, once the connector receivers 80 receive the connectors 22, 32, such as by receiving the protrusions 24, 34 within the connector receiver recesses 80, the extension members 20, 30 will return to their relaxed state and will hold the liner assembly 10 in position adjacent the central portion 82 of the axle bracket 72 to thereafter be coupled to the axle 108.

It will be appreciated that the extension members and their connectors on the liner assembly may be configured to simply self-center and snap into place once they begin to be received by the connector receivers on the axle bracket, allowing the extension members to relax to a pre-deflected position. Thus, when the protrusions 24, 34 of the connectors 22, 32 on the extension members 20, 30 enter the recesses 80, they will tend to snap into position and the extension members 20, 30 will tend to return to a pre-deflected position. It will be appreciated that alternative configurations may be used, with various manners of connectors being received by connector receivers, such as by having the connectors be configured so as to require being manually pressed into the connector receivers once they become sufficiently aligned.

In the example of FIGS. 4-6, the U-shaped body of the axle bracket 72 of the liner assembly and axle bracket combination 74 includes a central portion 82 and two depending flanges 84, 86 connected to the central portion 82. The central portion 82 also includes at least one passage 88 extending between the opposed ends 76, 78 of the central portion 82. The at least one passage 88 has an open side wall along a surface 90 of the central portion 82, wherein the at least one passage 88 is open to a space 92 between the depending flanges 84, 86. Thus, in this example, the at least one passage 88 is configured as a downwardly open channel. With this configuration, when the connectors 22, 32 of the liner assembly 10 are received by the connector receivers 80 of the axle bracket 72, the elongated base 14 of the liner assembly 10 extends between the depending flanges 84, 86 and adjacent the surface 90 of the central portion 82 having the open side wall of the at least one passage 88. It will be appreciated that the depending flanges may be connected to the central portion 82 of the axle bracket 72 by being integrally formed with the central portion or by utilizing any suitable method of mechanical connection of the components.

In the example axle coupling assembly 70 shown in FIG. 4, the axle bracket 72 includes at least a second passage 88 that extends between opposed ends 76, 78 of the central portion 82 of the axle bracket 72. The second passage 88 also is open to the space 92 between the depending flanges 84, 86. Further, each of the first and second passages 88 accommodates a U-shaped fastener 94 having a bight portion or bridge 96 that is received in a passage 88, and legs 98 extending from the bight portion 96. The distal ends of the legs 98 are externally threaded and pass through apertures in a top plate 100 where they receive suitable fasteners 102, which in this example include internally threaded nuts. Also included in the example axle coupling assembly 70 is a spacer 104 which rests atop the axle bracket 72. The spacer 104 further displaces a spring 106, which is captured by the axle coupling assembly 70, from the axle receiving space 58 between the side walls 50, 52 of the liner assembly 10. The axle receiving space 58 of the liner assembly 10 coincides generally with the space 92 between the depending flanges 84, 86 of the axle bracket 72, and the respective spaces 58, 92 receive the axle 108.

It will be understood that the axle bracket of the liner assembly and axle bracket combination may be constructed of many different materials, including various metals such as aluminum, steel, alloys or other suitable rigid materials. Depending on the materials and configurations, components of the liner assemblies also may be manufactured in various ways, such as by extrusion, casting or forging and machining or other suitable manufacturing methods, and components of the axle bracket may be separately formed and then joined or may be integrally formed from one material and as one continuous piece.

It will be appreciated that during pre-assembly of the axle coupling assembly 70, each bight portion 96 of a U-shaped fastener 94 may be inserted into a passage 88 through the central portion 82 of the axle bracket 72. The liner assembly 10 then may be moved into the space 92 between the depending flanges 84, 86 and connected to the axle bracket 72 when the connectors 22, 32 are received by the connector receivers 80 of the axle bracket 72. With the liner assembly 10 connected to the axle bracket 72, the elongated base 14 of the liner assembly 10 is adjacent the surface 90 of the central portion 82 and will block the U-shaped fasteners 94 from falling out of the passages 88. Thus, the U-shaped fasteners 94 may be conveniently held by the liner assembly 10 while the fasteners 102 are connected to the distal ends of the legs 98. This overcomes the difficulty of an operator having to hold the loose fasteners 94 within the passages 88 when assembling the axle coupling assembly 70, while also permitting the liner assembly 10 to be included within the pre-assembly of the axle coupling assembly 70, instead of requiring separate transportation, stocking and later installation of the liner assembly to the axle at the sight of final installation of the axle to the axle coupling assembly.

While it is contemplated that a liner assembly and axle bracket combination may be disposed only adjacent one side of an axle, as shown in FIGS. 4-6, the liner assembly 10 of the liner assembly and axle bracket combination 74 of the present example may include two side walls 50, 52 extending from the elongated base 14 and being disposed adjacent the respective depending flanges 84, 86 of the axle bracket 72. Indeed, with this example, when connecting the liner assembly 10 to the axle bracket 72, moving the liner assembly 10 to position the elongated base 14 adjacent the central portion 82 of the axle bracket 72 causes the two side walls 50, 52 of the liner assembly 10 to be positioned adjacent the respective two depending flanges 84, 86 of the axle bracket 72.

Moreover, the two side walls 50, 52 of the liner assembly 10 also may include distal portions 54, 56 that are flared outward relative to the side walls 50, 52 and that extend beyond the depending flanges 84, 86 of the axle bracket 72. This allows the liner assembly 10 to help protect the lower ends of the depending flanges 84, 86 when the pre-assembled axle coupling assembly 70 is being handled and shipped, as well as when the axle 108 is being inserted into the space 92 between the depending flanges 84, 86 and into the space 58 between the side walls 50, 52 of the liner assembly 10, for final connection to the axle coupling assembly 70. The axle 108 may be connected to the axle coupling assembly 70 in any suitable manner, such as by use of fasteners that pass through aligned apertures in the depending flanges 84, 86, the liner assembly side walls 50, 52 and the axle 108.

It will be appreciated that the liner assembly 10 of the liner assembly and axle bracket combination 74 may include the aforementioned locating members 40, 42 at the first and second ends 16, 18 of the elongated base 14. The locating members 40, 42 provide an upstanding edge or lip and may be helpful to an operator by providing further structures that help positively position the liner assembly 10 as it is moved into place and connected to the axle bracket 72. The locating members 40, 42 also provide a retention feature by engaging the opposed ends 76, 78 of the central portion 82 of the axle bracket 72 when the liner assembly and axle bracket combination 74 are installed in a suspension system. Thus, the liner assembly 10 is prevented from shifting from its properly installed position between the axle bracket 72 and an axle 108. Moreover, a liner assembly 10 that includes side walls 50, 52 also may further include locating members 60, 62 that will engage the ends of the depending flanges 84, 86 during installation of the liner assembly 10 and during use of a suspension system that includes the liner assembly and axle bracket combination 74.

Figure 7:
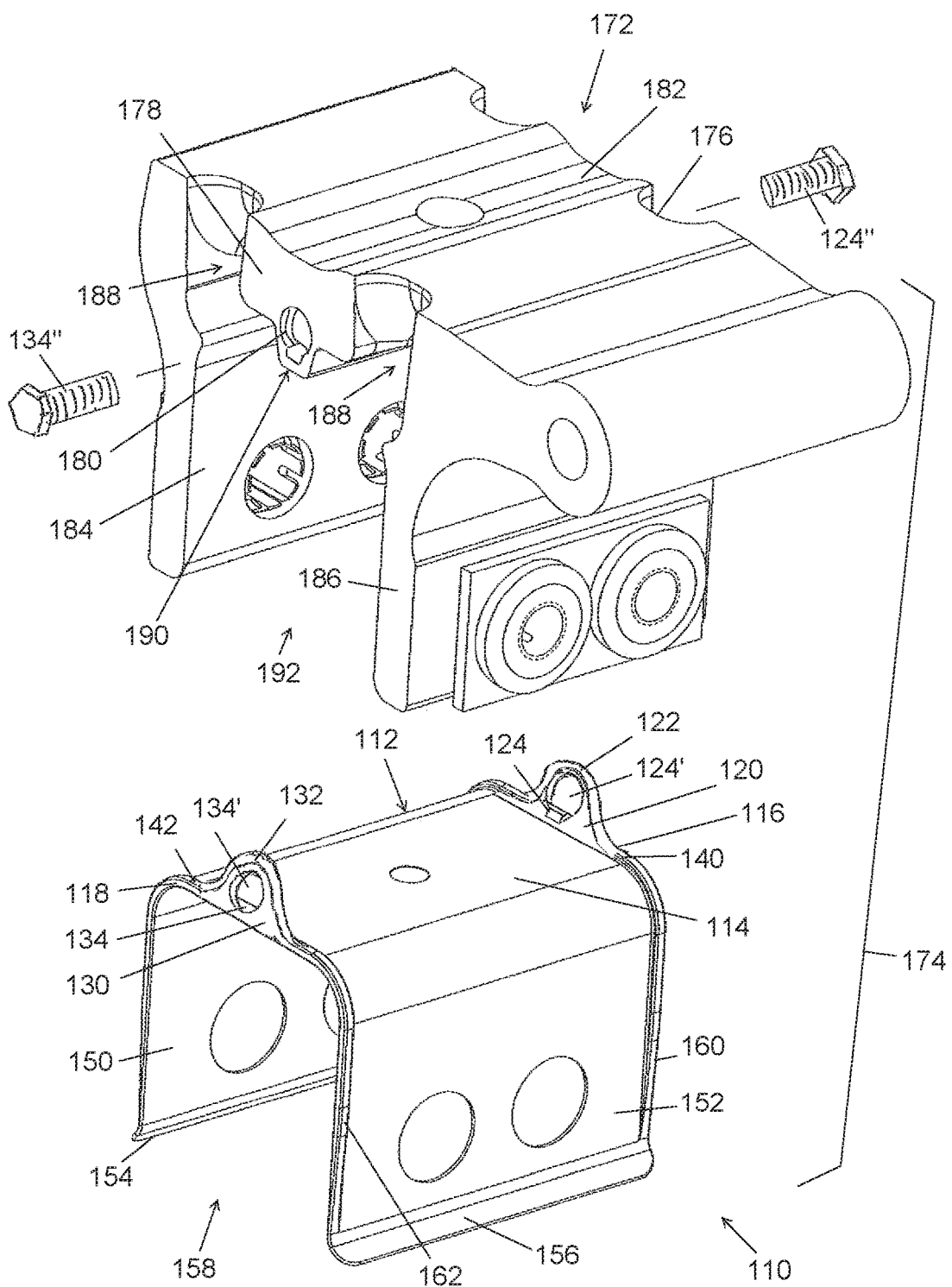
FIG. 7 is an exploded, upper front perspective view of a second example liner assembly and an axle bracket that may be used in an axle coupling assembly for coupling to an axle, similar to that shown in FIG. 6.

Turning to FIG. 7, a second example liner assembly 110 for an axle bracket 172 of this disclosure is shown. The liner assembly 110 has a body 112, which includes an elongated base 114 and at least one extension member 120. The elongated base has a first end 116 and a second end 118, and the extension member 120 extends from the first end 116. The extension member 120 has a connector 122 having a protrusion 124. The connector 122 also has an aperture 124' adjacent the protrusion 124. The protrusion 124 may be of a tapered self-centering shape when configured for coupling to a connector receiver 180 of an axle bracket 172 that is in the form of an aperture. The connector receiver 180 may also include a fastener 124". The aperture 124' of the connector 122 may be aligned with the aperture of the connector receiver 180. The aperture 124' of the connector 122 may thereafter be received by the fastener 124" of the connector receiver 180, for a more robust connection of the liner assembly 110 to the axle bracket 172. It will be appreciated that the fastener 124" may be of various configurations, such as a threaded screw or press fit pin, peg or the like. Also, the aperture of the connector receiver 180 of this example may be configured to be complementary to the fastener 124". Thus, in this second example, the aperture of the connector receiver 180 may be internally threaded to receive the fastener 124", while including a notch to initially receive the protrusion 124 when the liner assembly 110 is moved into position for installation against the axle bracket 172.

In this example, the body 112 of the liner assembly 110 may further include at least a second extension member 130 that may have a connector 132 that may be coupled to a similar connector receiver. The second extension member 130 may extend from the second end 118 of the elongated base 114, and the connector 132 may be similar to the connector 122, such as by having a protrusion 134 and an aperture 134'. Also, the extension members 120, 130 are configured to deflect or bend when they engage an axle bracket. Indeed, the at least two extension members 120, 130 will deflect outward, in opposed directions, when the liner assembly 110 is being connected to an axle bracket 172.

The elongated base 114 of the body 112 of this second example liner assembly 110 may include a first locating member 140, similar to the advantageous locating member 40 of the first example liner assembly 10. A further second locating member 142, similar to the second locating member 42, also may be included to provide the benefits described with respect to the first example.

With the second example shown in FIG. 7, the body 112 of the liner assembly 110 may further include two side walls 150, 152 extending from the elongated base 114. The two side walls 150, 152 may include distal portions 154, 156 that are flared outward relative to the side walls 150, 152 to provide the advantages noted with respect to the first example and to provide an entry to an axle receiving space 158 between the side walls 150, 152. The two side walls 150, 152 may extend from the elongated base 114 in a direction opposite the at least one extension member 120. To further assist in locating a liner assembly 110 during installation and to help keep the liner assembly in position during operation of the fully assembled suspension, the side walls 150, 152 may have a beneficial first locating member 160, similar to the first locating member 60 of the first example, and a second locating member 162 similar to the second locating member 62 of the first example. The liner assembly 110 also may be constructed from a variety of materials and in a variety of configurations, as noted with respect to the first example liner assembly 10.

It will be appreciated that a second example liner assembly and axle bracket combination 174 is disclosed as including the aforementioned second example liner assembly 110 having a body 112 including an elongated base 114 that includes at least one extension member 120 that has at least one connector 122. The assembly 174 further includes the axle bracket 172 having a body having a central portion 182 and at least one connector receiver 180 configured to receive the at least one connector 122 of the at least one extension member 120 of the liner assembly 110. In the second example shown, it will be appreciated that the liner assembly 110 may include at least a second extension member 130 having a connector 132, and the axle bracket 172 may further include at least a second connector receiver 180 to receive the connector 132 on the at least second extension member 130. Indeed, the liner assembly 110 is shown with at least two extension members 120, 130 at opposed ends 116, 118 of the elongated base 114, and each extension member 120, 130 further includes a connector 122, 132, as described above respectively. The central portion 182 of the axle bracket 172 has opposed ends 176, 178, which may further include connector receivers 180 configured to receive the connectors 122, 132 of the extension members 120, 130 of the liner assembly 110.

It will be understood when viewing FIG. 7 that a method of connecting a liner assembly to an axle bracket may include holding an axle bracket 172 having a body that includes a central portion 182 and at least one connector receiver 180, holding a liner assembly 110 having an elongated base 114 and at least one extension member 120 that includes a connector 122, and moving the liner assembly 110 to position the elongated base 114 adjacent the central portion 182 of the axle bracket 172, and wherein the connector receiver 180 on the axle bracket 172 receives the at least one connector 122 on the liner assembly 110. Thus, as the liner assembly 110 is moved into position to be connected to the axle bracket 172, the protrusion 124 of the connector 122 will engage the end 176 of the axle bracket 172. This will force the extension member 120 to deflect or bend until the liner assembly 110 is moved to a position wherein the protrusion 124 of the connector 122 is received by the notch of the aperture of the connector receiver 180 on the axle bracket 172. This provides a self-securing feature and the connector 122 may be configured to snap into position with the connector receiver 180, or to be pressed into engagement with the connector receiver 180. The fastener 124" of the connector receiver 180 then may be inserted for a more robust connection of the liner assembly 110 to the axle bracket 172.

The liner assembly 110 may include at least two extension members 120, 130, with each extension member having at least one connector 122, 132, respectively, while the axle bracket 172 may include at least two connector receivers 180. The moving of the liner assembly 110 to position the elongated base 114 of the liner assembly 110 adjacent the central portion 182 of the axle bracket 172 then permits the at least two connector receivers 180 on the axle bracket 172 to receive the respective at least two connectors 122, 132 on the liner assembly 110. For instance, in the second example shown, once the connector receivers 180 receive the connectors 122, 132, such as by receiving the protrusions 124, 134 within the notches of the apertures of the connector receivers 180, the extension members 120, 130 will return to their relaxed state and will hold the liner assembly 110 in position adjacent the central portion 182 of the axle bracket 172, for optional connection of the fasteners 124", 134" of the connection receivers 180, and to thereafter be coupled to the axle 108.

In the second example of FIG. 7, the U-shaped body of the axle bracket 172 of the liner assembly and axle bracket combination 174 may be constructed similarly to that of the first example axle bracket 72. Thus, the axle bracket 172 includes a central portion 182 and two depending flanges 184, 186 connected to the central portion 182. The central portion 182 also includes at least one passage 188 extending between the opposed ends 176, 178 of the central portion 182. The at least one passage 188 has an open side wall along a surface 190 of the central portion 182, wherein the at least one passage 188 is open to a space 192 between the depending flanges 184, 186. The opposed ends 176, 178 each have a connection receiver 180. With this configuration, when the connectors 122, 132 of the liner assembly 110 are received by the connector receivers 180 of the axle bracket 172, the elongated base 114 of the liner assembly 110 extends between the depending flanges 184, 186 and adjacent the surface 190 of the central portion 182 having the open side wall of the at least one passage 188.

As in the first example, the second example axle bracket 172 includes at least a second passage 188 that extends between opposed ends 176, 178 of the central portion 182 of the axle bracket 172. The second passage 188 also is open to the space 192 between the depending flanges 184, 186. Further, each of the first and second passages 188 will accommodate the previously described U-shaped fastener 94 for connection within an axle coupling assembly like that shown in FIGS. 4 and 6. It also will be understood that the axle bracket 172 of the liner assembly and axle bracket combination 174 may be constructed of suitable materials and using suitable methods of manufacturing, as discussed with respect to the first example.

Figure 8:
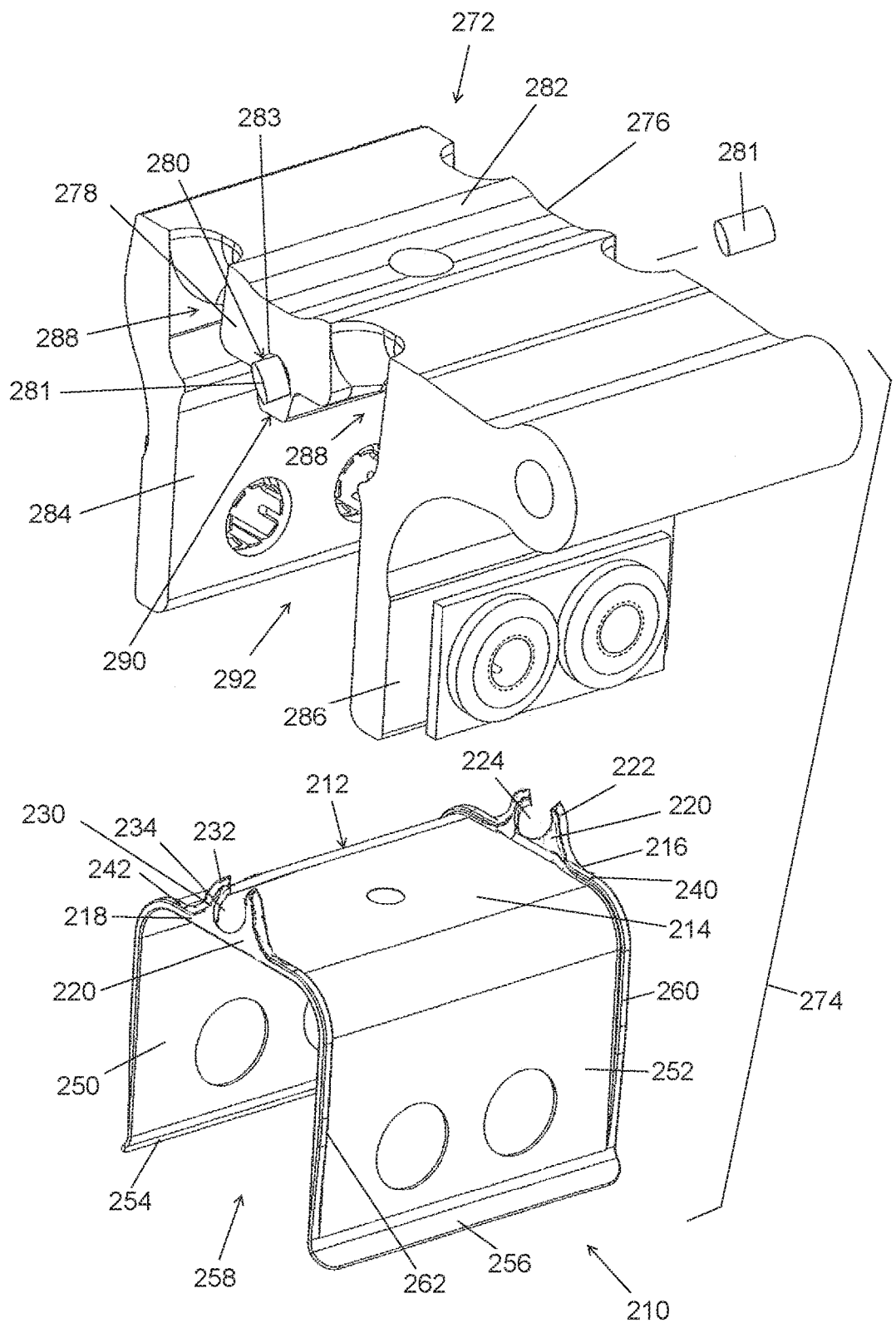
FIG. 8 is an exploded, upper front perspective view of a third example liner assembly and an axle bracket that may be used in an axle coupling assembly for coupling to an axle, similar to that shown in FIG. 6.

Turning to FIG. 8, a third example liner assembly 210 for an axle bracket 272 of this disclosure is shown. The liner assembly 210 has a body 212, which includes an elongated base 214 and at least one extension member 220. The elongated base has a first end 216 and a second end 218, and the extension member 220 extends from the first end 216. The extension member 220 has a connector 222 having a notch 224. The notch 224 may have a tapered self-centering shape to its entrance, such as by having a draft angle, concave or other suitable shape when configured for coupling to a connector receiver 280 of an axle bracket 272 that is in the form of a fastener 281 extending from an aperture 283. It will be appreciated that the fastener 281 may be of various configurations, such as a threaded screw or press fit pin, peg or the like. Thus, the connector receiver 280 of this example may include an aperture 283 that may be configured to be complementary to the fastener 281.

In this third example, the body 212 of the liner assembly 210 may further include at least a second extension member 230 that may have a connector 232. The second extension member 230 may extend from the second end 218 of the elongated base 214, and the connector 232 may be similar to the connector 222, such as by having a notch 134 having a tapered entrance. Also, the extension members 220, 230 are configured to deflect or bend when they engage an axle bracket 272 having a fastener 281. Indeed, the entrance of the notch 224, 234 of the at least two extension members 220, 230 will deflect laterally outward, in opposed directions, when the liner assembly 210 is being connected to an axle bracket 272 at the at least one connector receiver 280 having a fastener 281.

The elongated base 214 of the body 212 of this third example liner assembly 210 may include a first locating member 240, similar to the advantageous locating member 40 of the first example liner assembly 10. A further second locating member 242, similar to the second locating member 42, also may be included to provide the benefits described with respect to the first example.

With the third example shown in FIG. 8, the body 212 of the liner assembly 210 may further include two side walls 250, 252 extending from the elongated base 214. The two side walls 250, 252 may include distal portions 254, 256 that are flared outward relative to the side walls 250, 252 to provide the advantages noted with respect to the first example and to provide an entry to an axle receiving space 258 between the side walls 250, 252. The two side walls 250, 252 may extend from the elongated base 214 in a direction opposite the at least one extension member 220. To further assist in locating a liner assembly 210 during installation and to help keep the liner assembly in position during operation of the fully assembled suspension, the side walls 250, 252 may have a beneficial first locating member 260, similar to the first locating member 60 of the first example, and a second locating member 262 similar to the second locating member 62 of the first example. The liner assembly 210 also may be constructed from a variety of materials and in a variety of configurations, as noted with respect to the first example liner assembly 10.

It will be appreciated that a third example liner assembly and axle bracket combination 274 is disclosed as including the aforementioned third example liner assembly 210 having a body 212 including an elongated base 214 that includes at least one extension member 220 that has at least one connector 222. The assembly 274 further includes the axle bracket 272 having a body having a central portion 282 and at least one connector receiver 280 configured to receive the at least one connector 222 of the at least one extension member 220 of the liner assembly 210. In the third example shown, it will be appreciated that the liner assembly 210 may include at least a second extension member 230 having a connector 232, and the axle bracket 272 may further include at least a second connector receiver 280 to receive the connector 232 on the at least second extension member 230. Indeed, the liner assembly 210 is shown with at least two extension members 220, 230 at opposed ends 216, 218 of the elongated base 214, and each extension member 220, 230 further includes a connector 222, 232, as described above respectively. The central portion 282 of the axle bracket 272 has opposed ends 276, 278, which may further include connector receivers 280 configured to receive the connectors 222, 232 of the extension members 220, 230 of the liner assembly 210.

It will be understood when viewing FIG. 8 that a method of connecting a liner assembly to an axle bracket may include holding an axle bracket 272 having a body that includes a central portion 282 and at least one connector receiver 280, holding a liner assembly 210 having an elongated base 214 and at least one extension member 220 that includes a connector 222, and moving the liner assembly 210 to position the elongated base 214 adjacent the central portion 282 of the axle bracket 272, and wherein the connector receiver 280 on the axle bracket 272 receives the at least one connector 222 on the liner assembly 210. Thus, as the liner assembly 210 is moved into position to be connected to the axle bracket 272, the notch 224 of the connector 222 will engage the fastener 281 extending from the end 276 of the axle bracket 272. This will force the entrance of the notch 224 of the extension member 220 to deflect or bend laterally until the liner assembly 210 is moved to a position wherein the notch 224 of the connector 222 is received by the fastener 281 of the aperture of the connector receiver 280 on the axle bracket 272. This provides a self-securing feature and the connector 222 may be configured to snap into position with the connector receiver 280, or to be pressed into engagement with the connector receiver 280.

The liner assembly 210 may include at least two extension members 220, 230, with each extension member having at least one connector 222, 232, respectively, while the axle bracket 272 may include at least two connector receivers 280. The moving of the liner assembly 210 to position the elongated base 214 of the liner assembly 210 adjacent the central portion 282 of the axle bracket 272 then permits the at least two connector receivers 280 on the axle bracket 272 to receive the respective at least two connectors 222, 232 on the liner assembly 210. For instance, in the third example shown, once the connector receivers 280 receive the connectors 222, 232, such as by receiving the notches 224, 234 over the fasteners 281 of the connector receivers 280, the extension members 220, 230 will return to their relaxed state and will hold the liner assembly 210 in position adjacent the central portion 282 of the axle bracket 272, to thereafter be coupled to the axle 108.

In the third example of FIG. 8, the U-shaped body of the axle bracket 272 of the liner assembly and axle bracket combination 274 may be constructed similarly to that of the first example axle bracket 72. Thus, the axle bracket 272 includes a central portion 282 and two depending flanges 284, 286 connected to the central portion 282. The central portion 282 also includes at least one passage 288 extending between the opposed ends 276, 278 of the central portion 282. The at least one passage 288 has an open side wall along a surface 290 of the central portion 282, wherein the at least one passage 288 is open to a space 292 between the depending flanges 284, 286. The opposed ends 276, 278 each have a connection receiver 280. With this configuration, when the connectors 222, 232 of the liner assembly 210 are received by the connector receivers 280 of the axle bracket 272, the elongated base 214 of the liner assembly 210 extends between the depending flanges 284, 286 and adjacent the surface 290 of the central portion 282 having the open side wall of the at least one passage 288.

As in the first example, the third example axle bracket 272 includes at least a second passage 288 that extends between opposed ends 276, 278 of the central portion 282 of the axle bracket 272. The second passage 288 also is open to the space 292 between the depending flanges 284, 286. Further, each of the first and second passages 288 will accommodate the previously described U-shaped fastener 94 for connection within an axle coupling assembly like that shown in FIGS. 4 and 6. It also will be understood that the axle bracket 272 of the liner assembly and axle bracket combination 274 may be constructed of suitable materials and using suitable methods of manufacturing, as discussed with respect to the first example.

Figure 9:
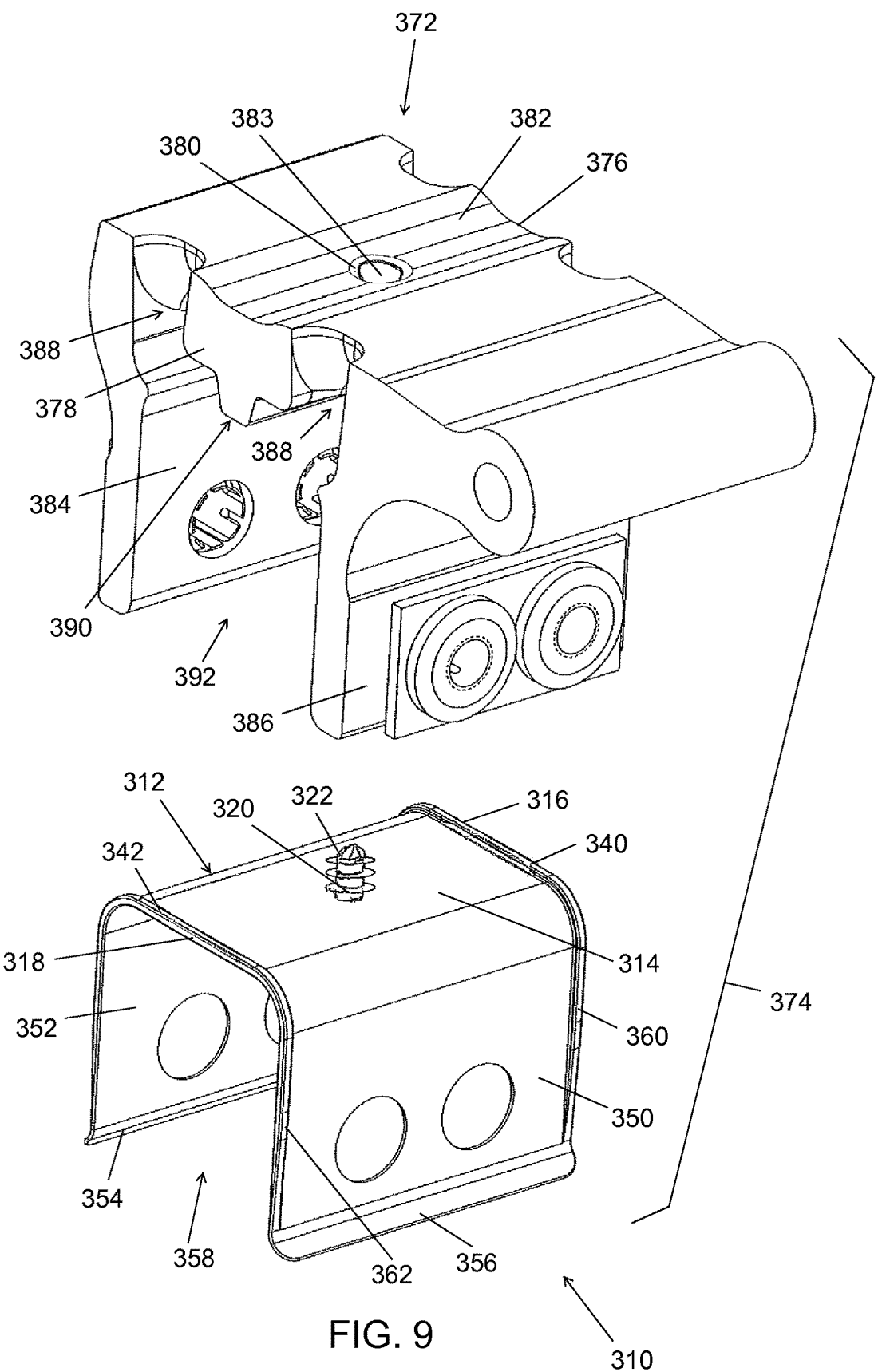
FIG. 9 is an exploded, upper front perspective view of a fourth example liner assembly and an axle bracket that may be used in an axle coupling assembly for coupling to an axle, similar to that shown in FIG. 6.

Turning to FIG. 9, a fourth example liner assembly 310 for an axle bracket 372 of this disclosure is shown. The liner assembly 310 has a body 312, which includes an elongated base 314 and at least one extension member 320. The elongated base 314 has a first end 316 and a second end 318, and the extension member 320 extends from a central portion of the elongated base 314. The extension member 320 has a connector 322. The connector 322 may be of a self-centering shape by having a tapered top portion when configured for coupling to a connector receiver 380 of an axle bracket 372 that is in the form of an aperture 383 in the lower surface of a central portion 382 of the axle bracket 372. It will be appreciated that the connector 322 may be of various configurations, such as having resilient fins for a press fit connection or the like. Thus, the connector receiver 380 of this example may include an aperture 383 that may be configured to be complementary to the connector 322.

In this fourth example, the body 312 of the liner assembly 310 may further include at least a second extension member similar to the first extension member, if desired. A second extension member may extend from the elongated base 314, and the at least second connector may be similar to the connector 322. Also, the extension member 320 may be configured to deflect or bend when it engages an axle bracket 372 having an aperture 383. Indeed, the connector 322 of the at least one extension member 320 may have resilient fins or other portions that deflect inward, in opposed directions, when the liner assembly 310 is being connected to an axle bracket 372 at the at least one connector receiver 380 having an aperture 383.

The elongated base 314 of the body 312 of this fourth example liner assembly 310 may include a first locating member 340, similar to the advantageous locating member 40 of the first example liner assembly 10. A further second locating member 342, similar to the second locating member 42, also may be included to provide the benefits described with respect to the first example.

With the fourth example shown in FIG. 9, the body 312 of the liner assembly 310 may further include two side walls 350, 352 extending from the elongated base 314. The two side walls 350, 352 may include distal portions 354, 356 that are flared outward relative to the side walls 350, 352 to provide the advantages noted with respect to the first example and to provide an entry to an axle receiving space 358 between the side walls 350, 352. The two side walls 350, 352 may extend from the elongated base 314 in a direction opposite the at least one extension member 320. To further assist in locating a liner assembly 310 during installation and to help keep the liner assembly in position during operation of the fully assembled suspension, the side walls 350, 352 may have a beneficial first locating member 360, similar to the first locating member 60 of the first example, and a second locating member 362 similar to the second locating member 62 of the first example. The liner assembly 310 also may be constructed from a variety of materials and in a variety of configurations, as noted with respect to the first example liner assembly 10.

It will be appreciated that a fourth example liner assembly and axle bracket combination 374 is disclosed as including the aforementioned fourth example liner assembly 310 having a body 312 including an elongated base 314 that includes at least one extension member 320 that has at least one connector 322. The assembly 374 further includes the axle bracket 372 having a body having a central portion 382 and at least one connector receiver 380 configured to receive the at least one connector 322 of the at least one extension member 320 of the liner assembly 310. In the fourth example shown, it will be appreciated that the liner assembly 310 may include at least a second extension member having a connector, and the axle bracket 372 may further include at least a second connector receiver to receive the connector on the at least second extension member. The central portion 382 of the axle bracket 372 has opposed ends 376, 378, which may further include a connector receiver 380 configured to receive the connector 322 of the extension member 320 of the liner assembly 310.

It will be understood when viewing FIG. 9 that a method of connecting a liner assembly to an axle bracket may include holding an axle bracket 372 having a body that includes a central portion 382 and at least one connector receiver 380, holding a liner assembly 310 having an elongated base 314 and at least one extension member 320 that includes a connector 322, and moving the liner assembly 310 to position the elongated base 314 adjacent the central portion 382 of the axle bracket 372, and wherein the connector receiver 380 on the axle bracket 372 receives the at least one connector 322 on the liner assembly 310. Thus, as the liner assembly 310 is moved into position to be connected to the axle bracket 372, the connector 322 will engage the aperture 383 of the connector receiver 380 in the central portion 382 of the axle bracket 372. This will force the resilient fins or other portions that deflect inward on the extension member 320 to deflect or bend until the liner assembly 310 is moved to a position wherein the connector 322 is received by the aperture 383 of the connector receiver 380 on the axle bracket 372. This provides a self-securing feature and the connector 322 may be configured to snap into position with the connector receiver 380, or to be pressed into engagement with the connector receiver 380.

The moving of the liner assembly 310 to position the elongated base 314 of the liner assembly 310 adjacent the central portion 382 of the axle bracket 372 then permits the at least one connector receiver 380 on the axle bracket 372 to receive the respective connector 322 on the liner assembly 310. For instance, in the fourth example shown, once the connector receiver 380 receives the connector 322 in the aperture 383 of the connector receiver 380, the extension members 320 will try to return to its relaxed state and will hold the liner assembly 310 in position adjacent the central portion 382 of the axle bracket 372, to thereafter be coupled to the axle 108.

In the fourth example of FIG. 9, the U-shaped body of the axle bracket 372 of the liner assembly and axle bracket combination 374 may be constructed similarly to that of the first example axle bracket 72. Thus, the axle bracket 372 includes a central portion 382 and two depending flanges 384, 386 connected to the central portion 382. The central portion 382 also includes at least one passage 388 extending between the opposed ends 376, 378 of the central portion 382. The at least one passage 388 has an open side wall along a surface 390 of the central portion 382, wherein the at least one passage 388 is open to a space 392 between the depending flanges 384, 386. With this configuration, when the connector 322 of the liner assembly 310 is received by the connector receiver 380 of the axle bracket 372, the elongated base 314 of the liner assembly 310 extends between the depending flanges 384, 386 and adjacent the surface 390 of the central portion 382 having the open side wall of the at least one passage 388.

As in the first example, the fourth example axle bracket 372 includes at least a second passage 388 that extends between opposed ends 376, 378 of the central portion 382 of the axle bracket 372. The second passage 388 also is open to the space 392 between the depending flanges 384, 386. Further, each of the first and second passages 388 will accommodate the previously described U-shaped fastener 94 for connection within an axle coupling assembly like that shown in FIGS. 4 and 6. It also will be understood that the axle bracket 372 of the liner assembly and axle bracket combination 374 may be constructed of suitable materials and using suitable methods of manufacturing, as discussed with respect to the first example.

Figure 10:
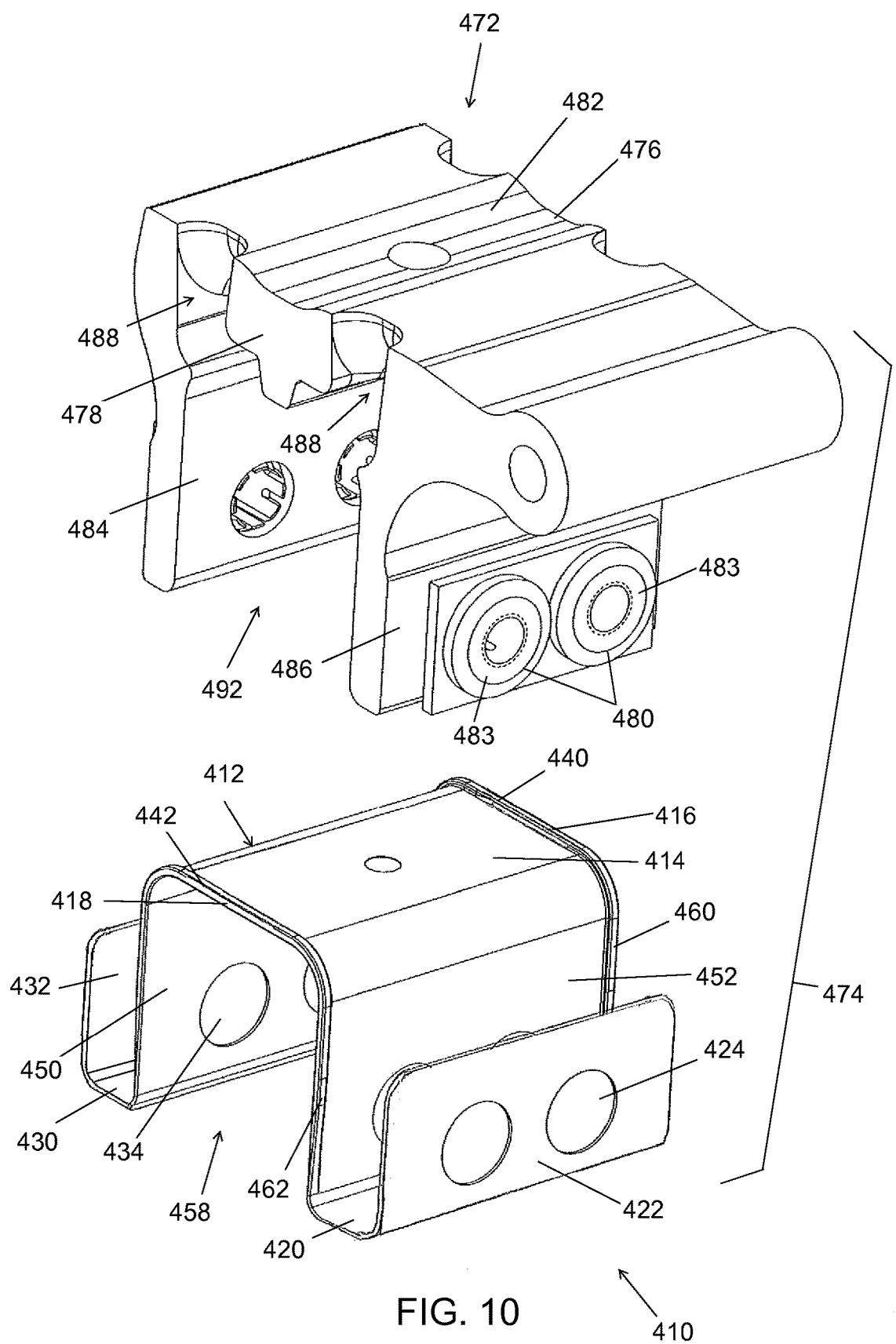
FIG. 10 is an exploded, upper front perspective view of a fifth example liner assembly and an axle bracket that may be used in an axle coupling assembly for coupling to an axle, similar to that shown in FIG. 6.

Turning to FIG. 10, a fifth example liner assembly 410 for an axle bracket 472 of this disclosure is shown. The liner assembly 410 has a body 412, which includes an elongated base 414 and at least one extension member 420. The elongated base 414 has a first end 416 and a second end 418, and the extension member 420 extends from a central portion of the elongated base 414. The extension member 420 has a connector 422 including at least one aperture 424. The at least one aperture 424 may be of a self-centering shape with respect to a tapered connector receiver 480 that may be inserted into the axle bracket 472 when configured for coupling to an axle bracket 472. It will be appreciated that the at least one extension member 420 may be of various configurations that engage a connector receiver 480. Thus, the connector receiver 480 of this example may include at least one fastener 483, in the configuration of a sleeve for axle coupling bolt or alternatively could include a temporary plug that may be configured to be complementary to the at least one aperture 424.

In this third example, the body 412 of the liner assembly 410 may further include at least a second extension member similar to the first extension member, if desired. A second extension member may extend from the elongated base 414, and the at least second connector may be similar to the connector 422. Also, the extension member 420 may be configured to deflect or bend when it engages an axle bracket 472. Indeed, the at least two extension members 420 may have resilient walls or other portions that deflect outward, in opposed directions, when the liner assembly 410 is being connected to an axle bracket 472 at the at least one connector receiver 480 having at least one fastener 483.

The elongated base 414 of the body 412 of this fifth example liner assembly 410 may include a first locating member 440, similar to the advantageous locating member 40 of the first example liner assembly 10. A further second locating member 442, similar to the second locating member 42, also may be included to provide the benefits described with respect to the first example.

With the fifth example shown in FIG. 10, the body 412 of the liner assembly 410 may further include two side walls 450, 452 extending from the elongated base 414. The two side walls 450, 452 may include distal portions 454, 456 that extend outward relative to the side walls 450, 452, which protect the lower ends of the axle bracket 472 and provide an entry to an axle receiving space 458 between the side walls 450, 452. The two side walls 450, 452 may extend from the elongated base 414 in a direction opposite the at least one extension member 420. To further assist in locating a liner assembly 410 during installation and to help keep the liner assembly in position during operation of the fully assembled suspension, the side walls 450, 452 may have a beneficial first locating member 460, similar to the first locating member 60 of the first example, and a second locating member 462 similar to the second locating member 62 of the first example. The liner assembly 410 also may be constructed from a variety of materials and in a variety of configurations, as noted with respect to the first example liner assembly 10.

It will be appreciated that a fifth example liner assembly and axle bracket combination 474 is disclosed as including the aforementioned fifth example liner assembly 410 having a body 412 including an elongated base 414 that includes at least one extension member 420 that has at least one connector 422. The assembly 474 further includes the axle bracket 472 having a body having a central portion 482 and at least one connector receiver 480 configured to receive the at least one connector 422 of the at least one extension member 420 of the liner assembly 410. In the fifth example shown, it will be appreciated that the liner assembly 410 may include at least a second extension member having a connector, and the axle bracket 472 may further include at least a second connector receiver to receive the connector on the at least second extension member. The central portion 482 of the axle bracket 472 has opposed ends 476, 478.

It will be understood when viewing FIG. 10 that a method of connecting a liner assembly to an axle bracket may include holding an axle bracket 472 having a body that includes a central portion 482 and at least one connector receiver 480, holding a liner assembly 410 having an elongated base 414 and at least one extension member 420 that includes a connector 422, and moving the liner assembly 410 to position the elongated base 414 adjacent the central portion 482 of the axle bracket 472, and wherein the connector receiver 480 on the axle bracket 472 receives the at least one connector 422 on the liner assembly 410. Thus, as the liner assembly 410 is moved into position to be connected to the axle bracket 472, the connector 422 will engage the central portion 482 of the axle bracket 472. This will force the extension members 420 to deflect outward or bend until the liner assembly 410 is moved to a position wherein the at least one fastener 483 of the connector receiver 480 receives the at least one aperture 424 of the connector 422 on the axle bracket 472. This provides a self-securing feature and the connector 422 may be configured to snap into position with the connector receiver 480, or to be pressed into engagement with the connector receiver 480.

The moving of the liner assembly 410 to position the elongated base 414 of the liner assembly 410 adjacent the central portion 482 of the axle bracket 472 then permits the at least one connector receiver 480 on the axle bracket 472 to receive the respective connector 422 on the liner assembly 410. For instance, in the fifth example shown, once the connector receiver 480 receives the connector 422, such as by receiving the at least one aperture 424 over the at least one fastener 483 of the connector receiver 480, the extension members 420 will try to return to its relaxed state and will hold the liner assembly 410 in position adjacent the central portion 482 of the axle bracket 472, to thereafter be coupled to the axle 108.

Figure 11:
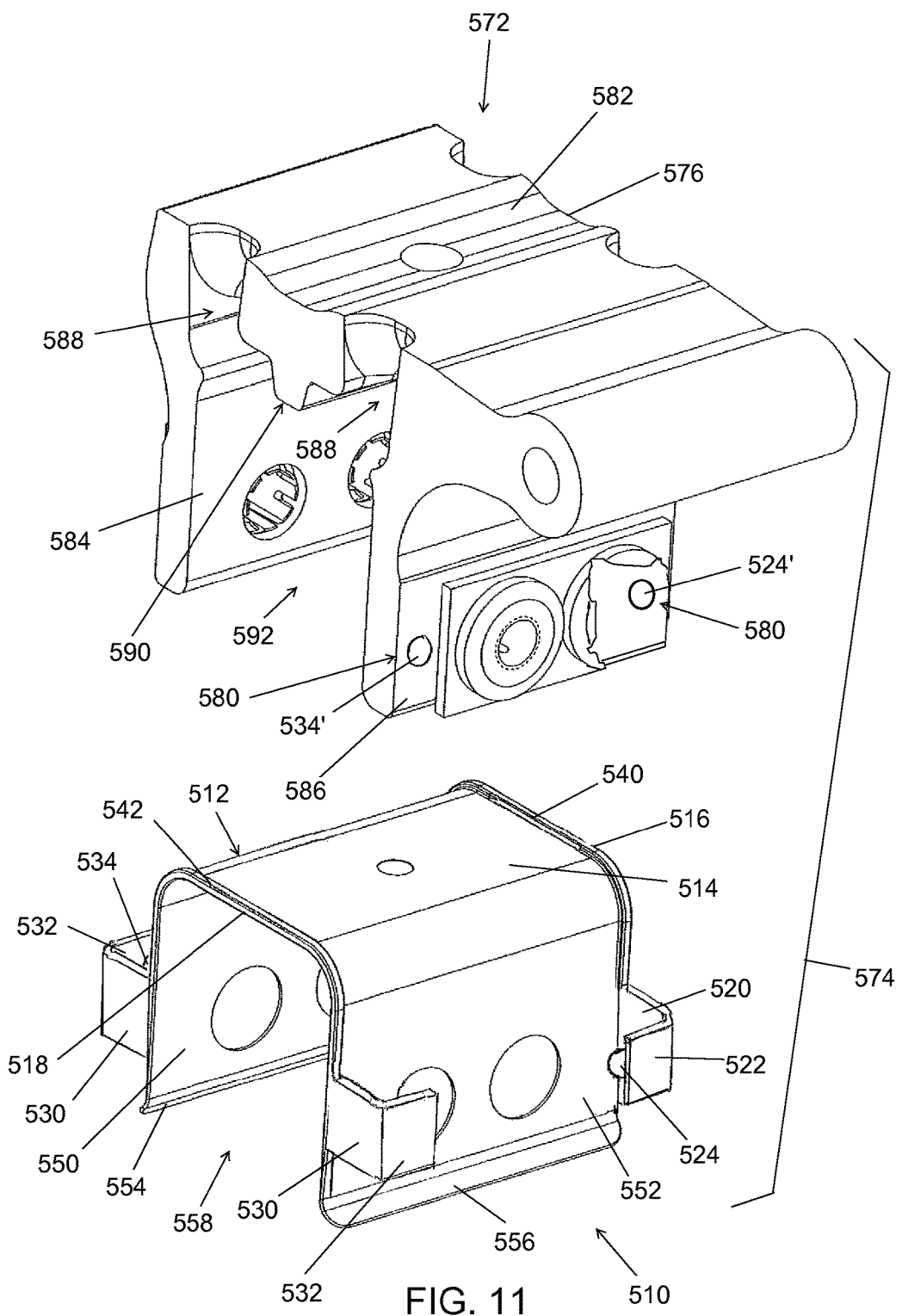
FIG. 11 is an exploded, upper front perspective view of a sixth example liner assembly and an axle bracket that may be used in an axle coupling assembly for coupling to an axle, similar to that shown in FIG. 6.

In the fifth example of FIG. 11, the U-shaped body of the axle bracket 472 of the liner assembly and axle bracket combination 474 may be constructed similarly to that of the first example axle bracket 72. Thus, the axle bracket 472 includes a central portion 482 and two depending flanges 484, 486 connected to the central portion 482. The central portion 482 also includes at least one passage 488 extending between the opposed ends 476, 478 of the central portion 482. The at least one passage 488 has an open side wall along a surface 490 of the central portion 482, wherein the at least one passage 488 is open to a space 492 between the depending flanges 484, 486. With this configuration, when the connector 422 of the liner assembly 410 is received by the connector receiver 480 of the axle bracket 472, the elongated base 414 of the liner assembly 410 extends between the depending flanges 484, 486 and adjacent the surface 490 of the central portion 482 having the open side wall of the at least one passage 488.

As in the first example, the fifth example axle bracket 472 includes at least a second passage 488 that extends between opposed ends 476, 478 of the central portion 482 of the axle bracket 472. The second passage 488 also is open to the space 492 between the depending flanges 484, 486. Further, each of the first and second passages 488 will accommodate the previously described U-shaped fastener 94 for connection within an axle coupling assembly like that shown in FIGS. 4 and 6. It also will be understood that the axle bracket 472 of the liner assembly and axle bracket combination 474 may be constructed of suitable materials and using suitable methods of manufacturing, as discussed with respect to the first example.

Turning to FIG. 11, a sixth example liner assembly 510 for an axle bracket 572 of this disclosure is shown. The liner assembly 510 has a body 512, which includes an elongated base 514 and at least one extension member 520. In this sixth example liner assembly 510, the elongated base 514 includes at least one side wall 550, and has a first end 516 and a second end 518. An extension member 520 extends from the first end 516 and has a connector 522 having a protrusion 524. The protrusion 524 may be of a tapered self-centering shape, such as a hemisphere or the like, when configured for coupling to a connector receiver 580 of an axle bracket 572 that is in the form of a recess 524'. The protrusion 524 of the connector 522 may be received by the recess 524' of the connector receiver 580 on the axle bracket 572 when the liner assembly 510 is moved into position for installation against the axle bracket 572. It will be appreciated that the protrusion 524 may be of various configurations and the recess 524' of the connector receiver 580 of this example may be configured to be complementary to the protrusion 524.

In this example, the body 512 of the liner assembly 510 may further include at least a second extension member 530 that may have a connector 532 having a similar protrusion 534 to that of protrusion 524, which may be coupled to a similar recess 534' of the connector receiver 580. The second extension member 530 and connector 532 may extend from the second end 518 of the side wall 550 of the elongated base 514, and the extension member 530 may be similar but in an opposed direction to the extension member 520. Also, the extension members 520, 530 are configured to deflect or bend when they engage an axle bracket. Indeed, the at least two extension members 520, 530 will deflect outward when the liner assembly 510 is being connected to an axle bracket 572.

The elongated base 514 of the body 512 of this sixth example liner assembly 510 may include a first locating member 540 having an upstanding edge or lip at the first end 516 to further assist in locating a liner assembly 510 during installation and to help keep the liner assembly in position during operation of the fully assembled suspension, similarly to the advantageous locating members 40 and 60 of the first example liner assembly 10. A further second locating member 542, similar to the second locating members 42 and 62, also may be included to further assist in providing the location and retention benefits previously described.

With the sixth example shown in FIG. 11, the elongated base 514 of the body 512 of the liner assembly 510 includes the two side walls 550, 552. The two side walls 550, 552 may include distal portions 554, 556 that are flared outward relative to the side walls 550, 552 to provide the advantages noted with respect to the first example and to provide an entry to an axle receiving space 558 between the side walls 550, 552. The two side walls 550, 552 may extend in a direction opposite the at least one extension member 520. The liner assembly 510 also may be constructed from a variety of materials and in a variety of configurations, as noted with respect to the first example liner assembly 10.

It will be appreciated that a sixth example liner assembly and axle bracket combination 574 is disclosed as including the aforementioned sixth example liner assembly 510 having a body 512 including an elongated base 514 that includes at least one extension member 520 that has at least one connector 522. The assembly 574 further includes the axle bracket 572 having a body having a central portion 582 and at least one connector receiver 580 configured to receive the at least one connector 522 of the at least one extension member 520 of the liner assembly 510. In the sixth example shown, it will be appreciated that the liner assembly 510 may include at least a second extension member 530 having a connector 532, and the axle bracket 572 may further include at least a second connector receiver 580 to receive the connector 532 on the at least second extension member 530. Indeed, the liner assembly 510 is shown with at least two extension members 520, 530 at opposed ends 516, 518 of the elongated base 514, and each extension member 520, 530 further includes a connector 522, 532, as described above respectively. The central portion 582 of the axle bracket 572 has opposed ends 576, 578.

It will be understood when viewing FIG. 11 that a method of connecting a liner assembly to an axle bracket may include holding an axle bracket 572 having a body that includes a central portion 582 and at least one connector receiver 580, holding a liner assembly 510 having an elongated base 514 and at least one extension member 520 that includes a connector 522, and moving the liner assembly 510 to position the elongated base 514 adjacent the central portion 582 of the axle bracket 572, and wherein the connector receiver 580 on the axle bracket 572 receives the at least one connector 522 on the liner assembly 510. Thus, as the liner assembly 510 is moved into position to be connected to the axle bracket 572, the protrusion 524 of the connector 522 will engage the recess of the connector receiver 580 of the axle bracket 572. This will force the extension member 520 to deflect or bend until the liner assembly 510 is moved to a position wherein the protrusion 524 of the connector 522 is received by the recess of the connector receiver 580 on the axle bracket 572. This provides a self-securing feature and the connector 522 may be configured to snap into position with the connector receiver 580, or to be pressed into engagement with the connector receiver 580.

The liner assembly 510 may include at least two extension members 520, 530, with each extension member having at least one connector 522, 532, respectively, while the axle bracket 572 may include at least two connector receivers 580 having recesses 524', 534'. The moving of the liner assembly 510 to position the elongated base 514 of the liner assembly 510 adjacent the central portion 582 of the axle bracket 572 then permits the at least two connector receivers 580 on the axle bracket 572 to receive the respective at least two connectors 522, 532 on the liner assembly 510. For instance, in the sixth example shown, once the connector receivers 580 receive the connectors 522, 532, such as by receiving the protrusions 524, 534 within the recesses 524', 534' of the connector receivers 580, the extension members 520, 530 will return to their relaxed state and will hold the liner assembly 510 in position adjacent the central portion 582 of the axle bracket 572, and to thereafter be coupled to the axle 108.

In the sixth example of FIG. 11, the U-shaped body of the axle bracket 572 of the liner assembly and axle bracket combination 574 may be constructed similarly to that of the first example axle bracket 72. Thus, the axle bracket 572 includes a central portion 582 and two depending flanges 584, 586 connected to the central portion 582. The central portion 582 also includes at least one passage 588 extending between the opposed ends 576, 578 of the central portion 582. The at least one passage 588 has an open side wall along a surface 590 of the central portion 582, wherein the at least one passage 588 is open to a space 592 between the depending flanges 584, 586, each of which has a connection receiver 580. With this configuration, when the connectors 522, 532 of the liner assembly 510 are received by the connector receivers 580 of the axle bracket 572, the elongated base 514 of the liner assembly 510 extends between the depending flanges 584, 586 and adjacent the surface 590 of the central portion 582 having the open side wall of the at least one passage 588.

As in the first example, the sixth example axle bracket 572 includes at least a second passage 588 that extends between opposed ends 576, 578 of the central portion 582 of the axle bracket 572. The second passage 588 also is open to the space 592 between the depending flanges 584, 586. Further, each of the first and second passages 588 will accommodate the previously described U-shaped fastener 94 for connection within an axle coupling assembly like that shown in FIGS. 4 and 6. It also will be understood that the axle bracket 572 of the liner assembly and axle bracket combination 574 may be constructed of suitable materials and using suitable methods of manufacturing, as discussed with respect to the first example.

Figure 12:
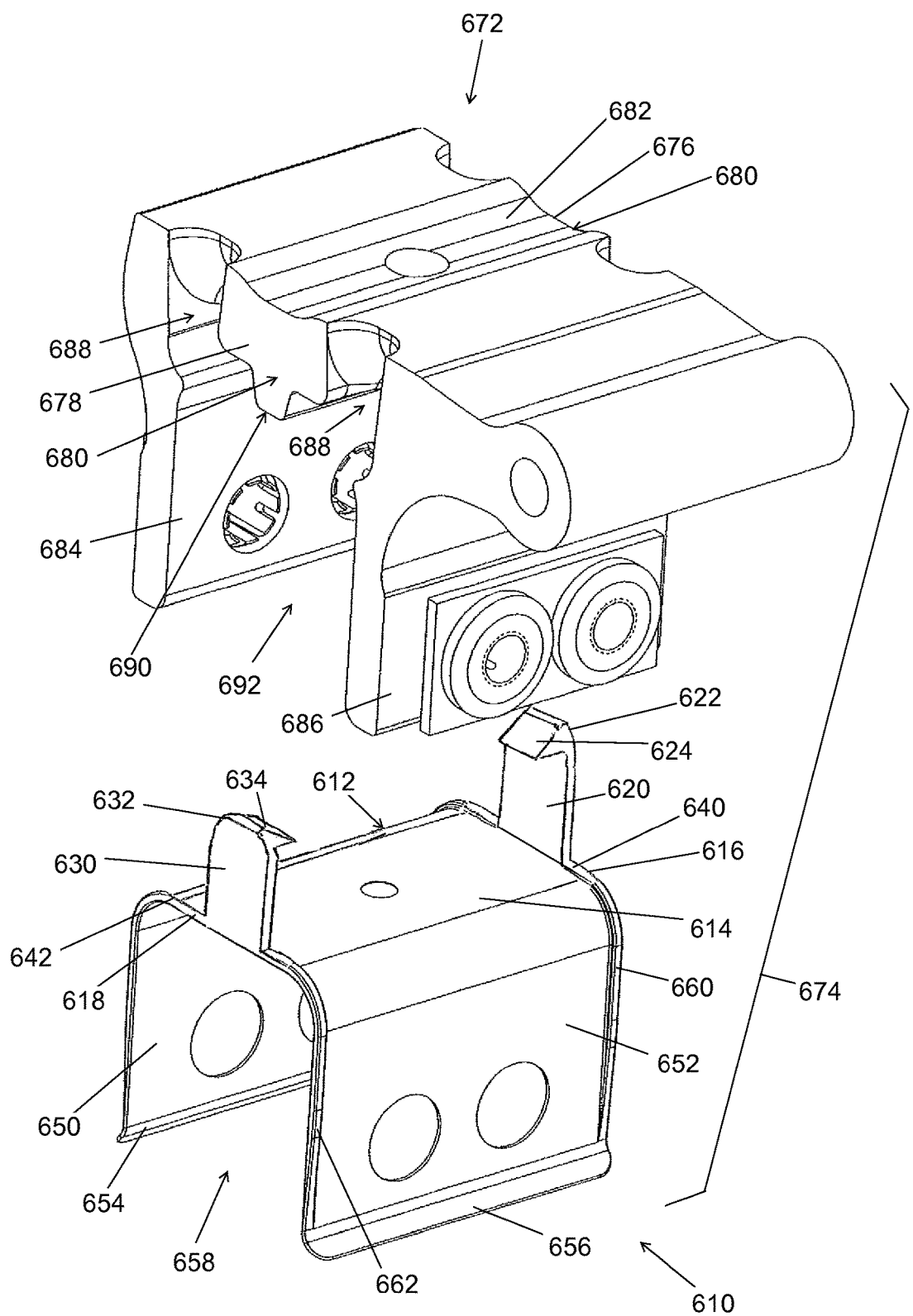
FIG. 12 is an exploded, upper front perspective view of a seventh example liner assembly and an axle bracket that may be used in an axle coupling assembly for coupling to an axle, similar to that shown in FIG. 6.

Turning to FIG. 12, a seventh example liner assembly 610 for an axle bracket 672 of this disclosure is shown. The liner assembly 610 has a body 612, which includes an elongated base 614 and at least one extension member 620. The elongated base 614 has a first end 616 and a second end 618, and the extension member 620 extends from the first end 616. The extension member 620 has a connector 622 having a protrusion 624. The protrusion 624 may be of a tapered shape when configured for coupling to a connector receiver 680 of an axle bracket 672 that is configured as a first end 676 of a central portion 682 of the axle bracket 672. The connector receiver 680 may have a thickness that is generally similar to the distance between the protrusion 624 and a top surface of the elongated base 614. It will be appreciated that the connector 622 may be of various configurations.

In this example, the body 612 of the liner assembly 610 may further include at least a second extension member 630 that may have a connector 632 that may be coupled to a similar connector receiver 680 at a second end 678 of the central portion 682 of the axle bracket 672 when installed. The second extension member 630 may extend from the second end 618 of the elongated base 614, and the connector 632 may be similar to the connector 622, such as by having a protrusion 634. Also, the extension members 620, 630 are configured to deflect or bend when they engage an axle bracket. Indeed, the tapered upper surface of the protrusions 624, 634 will cause the at least two extension members 620, 630 to deflect outward, in opposed directions, when the liner assembly 610 is being connected to an axle bracket 672.

The elongated base 614 of the body 612 of this seventh example liner assembly 610 may include a first locating member 640, similar to the advantageous locating member 40 of the first example liner assembly 10. A further second locating member 642, similar to the second locating member 42, also may be included to provide the benefits described with respect to the first example.

With the seventh example shown in FIG. 12, the body 612 of the liner assembly 610 may further include two side walls 650, 652 extending from the elongated base 614. The two side walls 650, 652 may include distal portions 654, 656 that are flared outward relative to the side walls 650, 652 to provide the advantages noted with respect to the first example and to provide an entry to an axle receiving space 658 between the side walls 650, 652. The two side walls 650, 652 may extend from the elongated base 614 in a direction opposite the at least one extension member 620. To further assist in locating a liner assembly 610 during installation and to help keep the liner assembly in position during operation of the fully assembled suspension, the side walls 650, 652 may have a beneficial first locating member 660, similar to the first locating member 60 of the first example, and a second locating member 662 similar to the second locating member 62 of the first example. The liner assembly 610 also may be constructed from a variety of materials and in a variety of configurations, as noted with respect to the first example liner assembly 10.

It will be appreciated that a second example liner assembly and axle bracket combination 674 is disclosed as including the aforementioned second example liner assembly 610 having a body 612 including an elongated base 614 that includes at least one extension member 620 that has at least one connector 622. The assembly 674 further includes the axle bracket 672 having a body having a central portion 682 and at least one connector receiver 680 configured to receive the at least one connector 622 of the at least one extension member 620 of the liner assembly 610. In the seventh example shown, it will be appreciated that the liner assembly 610 may include at least a second extension member 630 having a connector 632, and the axle bracket 672 may further include at least a second connector receiver 680 to receive the connector 632 on the at least second extension member 630. Indeed, the liner assembly 610 is shown with at least two extension members 620, 630 at opposed ends 616, 618 of the elongated base 614, and each extension member 620, 630 further includes a connector 622, 632, as described above respectively. The central portion 682 of the axle bracket 672 has opposed ends 676, 678, which may further form the connector receivers 680 and be configured to receive the connectors 622, 632 of the extension members 620, 630 of the liner assembly 610.

It will be understood when viewing FIG. 12 that a method of connecting a liner assembly to an axle bracket may include holding an axle bracket 672 having a body that includes a central portion 682 and at least one connector receiver 680, holding a liner assembly 610 having an elongated base 614 and at least one extension member 620 that includes a connector 622, and moving the liner assembly 610 to position the elongated base 614 adjacent the central portion 682 of the axle bracket 672, and wherein the connector receiver 680 on the axle bracket 672 receives the at least one connector 622 on the liner assembly 610. Thus, as the liner assembly 610 is moved into position to be connected to the axle bracket 672, the protrusion 624 of the connector 622 will engage the end 676 of the axle bracket 672. This will force the extension member 620 to deflect or bend until the liner assembly 610 is moved to a position wherein the protrusion 624 of the connector 622 is received by the connector receiver 680 on the axle bracket 672. This provides a self-securing feature and the connector 622 may be configured to snap into position with the connector receiver 680, or to be pressed into engagement with the connector receiver 680.

The liner assembly 610 may include at least two extension members 620, 630, with each extension member having at least one connector 622, 632, respectively, while the axle bracket 672 may include at least two connector receivers 680. The moving of the liner assembly 610 to position the elongated base 614 of the liner assembly 610 adjacent the central portion 682 of the axle bracket 672 then permits the at least two connector receivers 680 on the axle bracket 672 to receive the respective at least two connectors 622, 632 on the liner assembly 610. For instance, in the seventh example shown, once the connector receivers 680 receive the connectors 622, 632, such as by receiving the protrusions 624, 634 over the central portion 682 of the axle bracket 672, the extension members 620, 630 will return to their relaxed state and will hold the liner assembly 610 in position adjacent the central portion 682 of the axle bracket 672, and to thereafter be coupled to the axle 108.

In the seventh example of FIG. 12, the U-shaped body of the axle bracket 672 of the liner assembly and axle bracket combination 674 may be constructed similarly to that of the first example axle bracket 72. Thus, the axle bracket 672 includes a central portion 682 and two depending flanges 684, 686 connected to the central portion 682. The central portion 682 also includes at least one passage 688 extending between the opposed ends 676, 678 of the central portion 682. The at least one passage 688 has an open side wall along a surface 690 of the central portion 682, wherein the at least one passage 688 is open to a space 692 between the depending flanges 684, 686. The opposed ends 676, 678 each form a connection receiver 680. With this configuration, when the connectors 622, 632 of the liner assembly 610 are received by the connector receivers 680 of the axle bracket 672, the elongated base 614 of the liner assembly 610 extends between the depending flanges 684, 686 and adjacent the surface 690 of the central portion 682 having the open side wall of the at least one passage 688.

As in the first example, the seventh example axle bracket 672 includes at least a second passage 688 that extends between opposed ends 676, 678 of the central portion 682 of the axle bracket 672. The second passage 688 also is open to the space 692 between the depending flanges 684, 686. Further, each of the first and second passages 688 will accommodate the previously described U-shaped fastener 94 for connection within an axle coupling assembly like that shown in FIGS. 4 and 6. It also will be understood that the axle bracket 672 of the liner assembly and axle bracket combination 674 may be constructed of suitable materials and using suitable methods of manufacturing, as discussed with respect to the first example.

Figure 13:
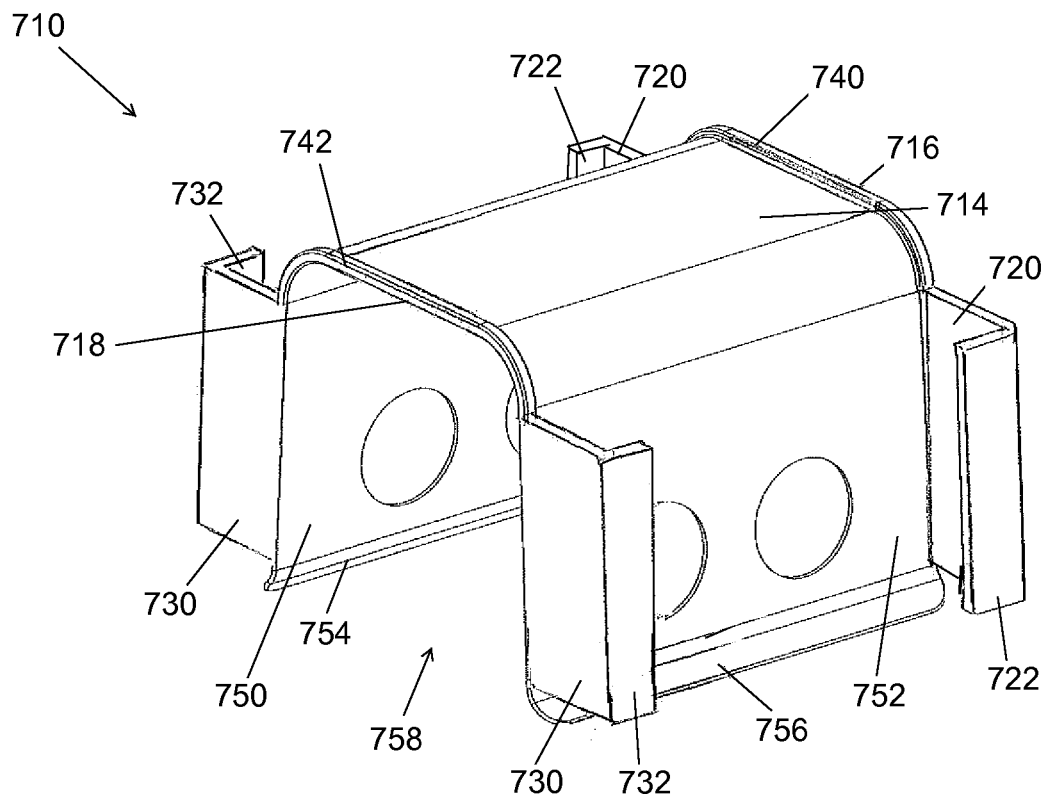
FIG. 13 is an upper front perspective view of an eighth example liner assembly for use with an axle bracket that may be used in an axle coupling assembly for coupling to an axle, similar to that shown in FIG. 6.
Figure 14:
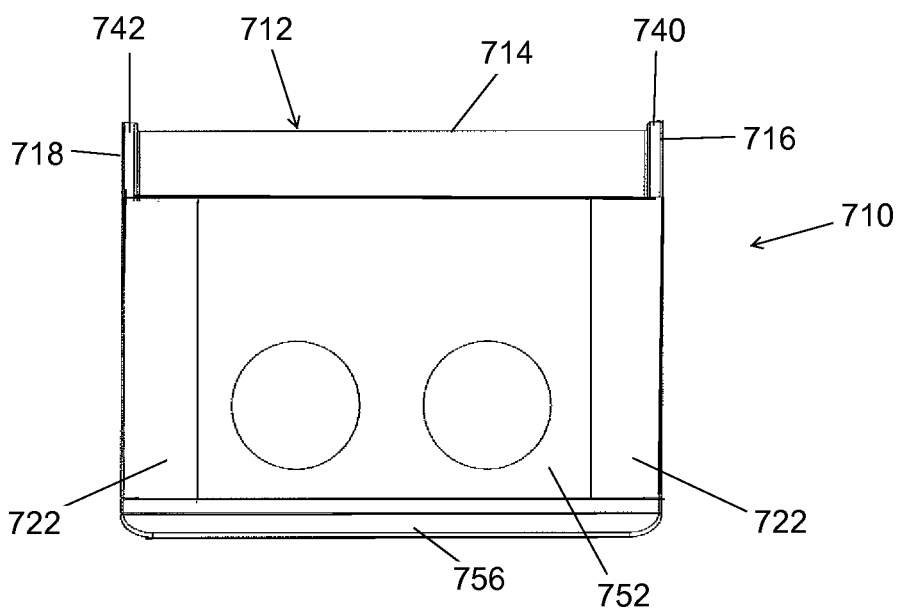
FIG. 14 is side view of the eighth example liner assembly of FIG. 13.

Turning to FIGS. 13-14, an eighth example liner assembly 710 for an axle bracket, such as axle bracket 72 of the first example, is shown. The liner assembly 710 has a body 712, which includes an elongated base 714 and at least one extension member 720. In this eighth example liner assembly 710, the elongated base 714 includes at least one side wall 750, and has a first end 716 and a second end 718. An extension member 720 extends from the first end 716 and has a connector 722 configured to form a sleeve. The sleeve of the connector 722 may be of a tapered shape, such that moving the liner assembly 710 into further engagement when coupling to a connector receiver of an axle bracket causes greater compression and retention force within the deflection of the connector 722. It will be appreciated that the extension member 720 and connector 722 may be of various configurations so as to be complementary to the connector receiver when coupling to an axle bracket, such as axle bracket 72.

In this example, the body 712 of the liner assembly 710 may further include at least a second extension member 730 that may have a connector 732 having a similar configuration but as a mirror image of the first extension member 720 and first connector 722. The second extension member 730 and connector 732 may extend from the second end 718 of the side wall 750 of the elongated base 714, and the extension member 730 may be similar but in an opposed direction to the extension member 720. Also, the extension members 720, 730 are configured to deflect or bend when they engage an axle bracket. Indeed, the at least two extension members 720, 730 will deflect outward as they develop the retention force when the liner assembly 710 is being connected to an axle bracket.

The elongated base 714 of the body 712 of this eighth example liner assembly 710 may include a first locating member 740 having an upstanding edge or lip at the first end 716 to further assist in locating a liner assembly 710 during installation and to help keep the liner assembly in position during operation of the fully assembled suspension, similarly to the advantageous locating member 40 of the first example liner assembly 10. A further second locating member 742, similar to the second locating member 42, also may be included to further assist in providing the location and retention benefits previously described, although it will be appreciated that the extension member 720, 730 will provide a locating function, as well.

With the eighth example shown in FIGS. 13-14, the elongated base 714 of the body 712 of the liner assembly 710 includes the two side walls 750, 752. The two side walls 750, 752 may include distal portions 754, 756 that are flared outward relative to the side walls 750, 752 to provide the advantages noted with respect to the first example and to provide an entry to an axle receiving space 758 between the side walls 750, 752. The liner assembly 710 also may be constructed from a variety of materials and in a variety of configurations, as noted with respect to the first example liner assembly 10.

It will be appreciated when viewing FIGS. 5, 6 and 13-14 that an eighth example liner assembly and axle bracket combination is disclosed as including the aforementioned eighth example liner assembly 710 having a body 712 including an elongated base 714 that includes at least one extension member 720 that has at least one connector 722. The assembly further includes an axle bracket, such as the example axle bracket 72 of the first example, having a body having a central portion 82 and two depending flanges 84, 86 connected to the central portion 82. The depending flange 84 provides at least one connector receiver configured to receive the at least one connector 722 of the at least one extension member 720 of the liner assembly 710. In the eighth example shown, it will be appreciated that the liner assembly 710 may include at least a second extension member 730 having a connector 732, and the depending flange 84 of the axle bracket 72 may further act as at least a second connector receiver to receive the connector 732 on the at least second extension member 730. Indeed, the liner assembly 710 is shown with at least two extension members 720, 730 at opposed ends 716, 718 of the elongated base 714, and each extension member 720, 730 further includes a connector 722, 732, as described above respectively. The central portion 82 of the axle bracket 72 has opposed ends 76, 78. It will be appreciated that the depending flange 86, similarly to the depending flange 84, provides at least a first connector receiver relative to the first end 716 and at least a second connector receiver 780 relative to the second end 718, with the connector receivers receiving the connectors 722, 732 of the extension members 720, 730.

It will be understood when viewing FIGS. 5, 6 and 13-14 that a method of connecting a liner assembly to an axle bracket may include holding an axle bracket 72 having a body that includes a central portion 82 and at least one connector receiver in the form of depending flange 84, holding a liner assembly 710 having an elongated base 714 and at least one extension member 720 that includes a connector 722, and moving the liner assembly 710 to position the elongated base 714 adjacent the central portion 82 of the axle bracket 72, and wherein the connector receiver of depending flange 84 on the axle bracket 72 receives the at least one connector 722 on the liner assembly 710. Thus, as the liner assembly 710 is moved into position to be connected to the axle bracket 72, the connector 722 will engage the depending flange 84 as the connector receiver of the axle bracket 72. This will force the extension member 720 to deflect until the liner assembly 710 is moved to a position wherein the depending flange 84 of the connector receiver receives the connector 722. The compression and retention force developed by the connector 722 during installation on the axle bracket 72 provides a self-securing feature and the connector 722 may be configured to include one or more features to snap into position with the connector receiver, if desired.

The liner assembly 710 may include at least two extension members 720, 730, with each extension member having at least one connector 722, 732, respectively, while the axle bracket 72 may include at least two connector receivers, such as is provided by at least the depending flange 84. The moving of the liner assembly 710 to position the elongated base 714 of the liner assembly 710 adjacent the central portion 82 of the axle bracket 72 then permits the at least two connector receivers on the axle bracket 72 to receive the respective at least two connectors 722, 732 on the liner assembly 710. For instance, in the eighth example shown, once the connector receivers of the depending flange 84 receive the connectors 722, 732, the extension members 720, 730 will try to return to their relaxed state and will generate a retention force to hold the liner assembly 710 in position adjacent the central portion 82 of the axle bracket 72, and to thereafter be coupled to the axle 108.

In the eighth example shown by way of FIGS. 5, 6 and 13-14, the U-shaped body of the axle bracket 72 of the liner assembly and axle bracket combination may be constructed similarly to that of the first example axle bracket 72. Thus, the axle bracket 72 includes a central portion 82 and two depending flanges 84, 86 connected to the central portion 82. The central portion 82 also includes at least one passage 88 extending between the opposed ends 76, 78 of the central portion 82. The at least one passage 88 has an open side wall along a surface 90 of the central portion 82, wherein the at least one passage 88 is open to a space 92 between the depending flanges 84, 86, each of which has a connection receiver 80. With this configuration, when the connectors 722, 732 of the liner assembly 710 are received by the connector receivers of the axle bracket 72, the elongated base 714 of the liner assembly 710 extends between the depending flanges 84, 86 and adjacent the surface 90 of the central portion 82 having the open side wall of the at least one passage 88.

As in the first example, when used in combination with the eighth example liner assembly 710, the axle bracket 72 may include at least a second passage 88 that extends between opposed ends 76, 78 of the central portion 82 of the axle bracket 72. The second passage 88 also is open to the space 92 between the depending flanges 84, 86. Further, each of the first and second passages 88 will accommodate the previously described U-shaped fastener 94 for connection within an axle coupling assembly like that shown in FIGS. 4 and 6. As noted with respect to the first example, the axle bracket 72 may be constructed of suitable materials and using suitable methods of manufacturing, as discussed with respect to the first example.

Figure 15:
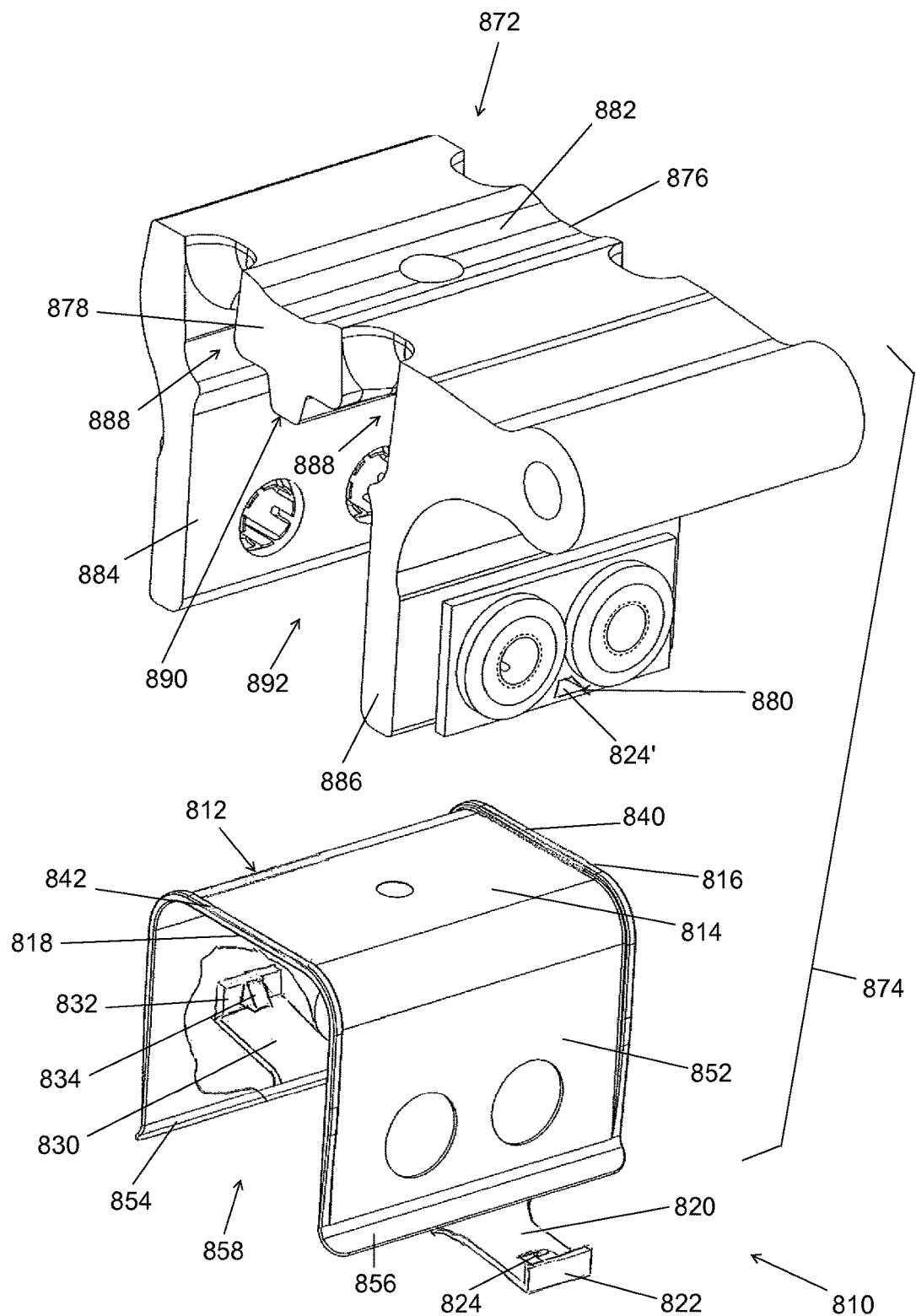
FIG. 15 is an exploded, upper front perspective view of a ninth example liner assembly and an axle bracket that may be used in an axle coupling assembly for coupling to an axle, similar to that shown in FIG. 6.

Turning to FIG. 15, a ninth example liner assembly 810 for an axle bracket 872 of this disclosure is shown. The liner assembly 810 has a body 812, which includes an elongated base 814 and at least one extension member 820. In this ninth example liner assembly 810, the elongated base 814 includes at least one side wall 850, and has a first end 816 and a second end 818. An extension member 820 extends from the first side wall 850 and has a connector 822 having a protrusion 824. The protrusion 824 may be configured to have a tapered self-centering shape, and may be tapered to cause deflection when initially engaged during coupling to a connector receiver 880 of an axle bracket 872 that is in the form of a recess 824'. The protrusion 824 of the connector 822 may be received by the recess 824' of the connector receiver 880 on the axle bracket 872 when the liner assembly 810 is moved into position for installation against the axle bracket 872. It will be appreciated that the protrusion 824 may be of various configurations and the recess 824' of the connector receiver 880 of this example may be configured to be complementary to the protrusion 824.

In this example, the body 812 of the liner assembly 810 may further include at least a second extension member 830 that is shown as extending from the second side wall 852. The at least second extension member 830 may have a connector 832 having a similar protrusion 834 to that of protrusion 824, which may be coupled to a recess of the connector receiver that is similar to the recess 824'. The second extension member 830 may be similar to, but may extend in an opposed direction to the extension member 820. Also, the extension members 820, 830 are configured to deflect or bend when they engage an axle bracket 872. Indeed, the at least two extension members 820, 830 will deflect outward when the liner assembly 810 is being connected to an axle bracket 872 as the tapered upper surface of the protrusions 724, 734 are engaged.

The elongated base 814 of the body 812 of this ninth example liner assembly 810 may include a first locating member 840 having an upstanding edge or lip at a first end 816 to further assist in locating a liner assembly 810 during installation and to help keep the liner assembly in position during operation of the fully assembled suspension, similarly to the advantageous locating members 40 and 60 of the first example liner assembly 10. A further second locating member 842, similar to the second locating members 42 and 62, also may be included to further assist in providing the location and retention benefits previously described.

With the ninth example shown in FIG. 15, the elongated base 814 of the body 812 of the liner assembly 810 includes the two side walls 850, 852. The two side walls 850, 852 may include distal portions 854, 856 that are flared outward relative to the side walls 850, 852 to provide the advantages noted with respect to the first example and to provide an entry to an axle receiving space 858 between the side walls 850, 852. The liner assembly 810 also may be constructed from a variety of materials and in a variety of configurations, as noted with respect to the first example liner assembly 10.

It will be appreciated that a ninth example liner assembly and axle bracket combination 874 is disclosed as including the aforementioned ninth example liner assembly 810 having a body 812 including an elongated base 814 that includes at least one extension member 820 that has at least one connector 822. The assembly 874 further includes the axle bracket 872 having a body having a central portion 882 and at least one connector receiver 880 configured to receive the at least one connector 822 of the at least one extension member 820 of the liner assembly 810. In the ninth example shown, it will be appreciated that the liner assembly 810 may include at least a second extension member 830 having a connector 832, and the axle bracket 872 may further include at least a second connector receiver 880 to receive the connector 832 on the at least second extension member 830. Indeed, the liner assembly 810 is shown with at least two extension members 820, 830 extending outward from the side walls 850, 852 of the elongated base 814, and each extension member 820, 830 further includes a connector 822, 832, as described above respectively. The central portion 882 of the axle bracket 872 has opposed ends 876, 878.

It will be understood when viewing FIG. 15 that a method of connecting a liner assembly to an axle bracket may include holding an axle bracket 872 having a body that includes a central portion 882 and at least one connector receiver 880, holding a liner assembly 810 having an elongated base 814 and at least one extension member 820 that includes a connector 822, and moving the liner assembly 810 to position the elongated base 814 adjacent the central portion 882 of the axle bracket 872, and wherein the connector receiver 880 on the axle bracket 872 receives the at least one connector 822 on the liner assembly 810. Thus, as the liner assembly 810 is moved into position to be connected to the axle bracket 872, the protrusion 824 of the connector 822 will engage the recess 824' of the connector receiver 880 of the axle bracket 872. This will force the extension member 820 to deflect or bend until the liner assembly 810 is moved to a position wherein the protrusion 824 of the connector 822 is received by the recess 824' of the connector receiver 880 on the axle bracket 872. This provides a self-securing feature and the connector 822 may be configured to snap into position with the connector receiver 880, or to be pressed into engagement with the connector receiver 880.

The liner assembly 810 may include at least two extension members 820, 830, with each extension member having at least one connector 822, 832, respectively, while the axle bracket 872 may include at least two connector receivers 880 having recesses. The moving of the liner assembly 810 to position the elongated base 814 of the liner assembly 810 adjacent the central portion 882 of the axle bracket 872 then permits the at least two connector receivers 880 on the axle bracket 872 to receive the respective at least two connectors 822, 832 on the liner assembly 810. For instance, in the ninth example shown, once the connector receivers 880 receive the connectors 822, 832, such as by receiving the protrusions 824, 834 within the recesses of the connector receivers 880, the extension members 820, 830 will return to their relaxed state and will hold the liner assembly 810 in position adjacent the central portion 882 of the axle bracket 872, and to thereafter be coupled to the axle 108.

In the ninth example of FIG. 15, the U-shaped body of the axle bracket 872 of the liner assembly and axle bracket combination 874 may be constructed similarly to that of the first example axle bracket 72, but the connector receivers 880 are coupled to the two depending flanges 884, 886. Thus, the axle bracket 872 includes a central portion 882 and two depending flanges 884, 886 connected to the central portion 882. The central portion 882 also includes at least one passage 888 extending between the opposed ends 876, 878 of the central portion 882. The at least one passage 888 has an open side wall along a surface 890 of the central portion 882, wherein the at least one passage 888 is open to a space 892 between the depending flanges 884, 886, each of which has a connection receiver 880. With this configuration, when the connectors 822, 832 of the liner assembly 810 are received by the connector receivers 880 of the axle bracket 872, the elongated base 814 of the liner assembly 810 extends between the depending flanges 884, 886 and adjacent the surface 890 of the central portion 882 having the open side wall of the at least one passage 888.

As in the first example, the ninth example axle bracket 872 includes at least a second passage 888 that extends between opposed ends 876, 878 of the central portion 882 of the axle bracket 872. The second passage 888 also is open to the space 892 between the depending flanges 884, 886. Further, each of the first and second passages 888 will accommodate the previously described U-shaped fastener 94 for connection within an axle coupling assembly like that shown in FIGS. 4 and 6. It also will be understood that the axle bracket 872 of the liner assembly and axle bracket combination 874 may be constructed of suitable materials and using suitable methods of manufacturing, as discussed with respect to the first example.

Figure 16:
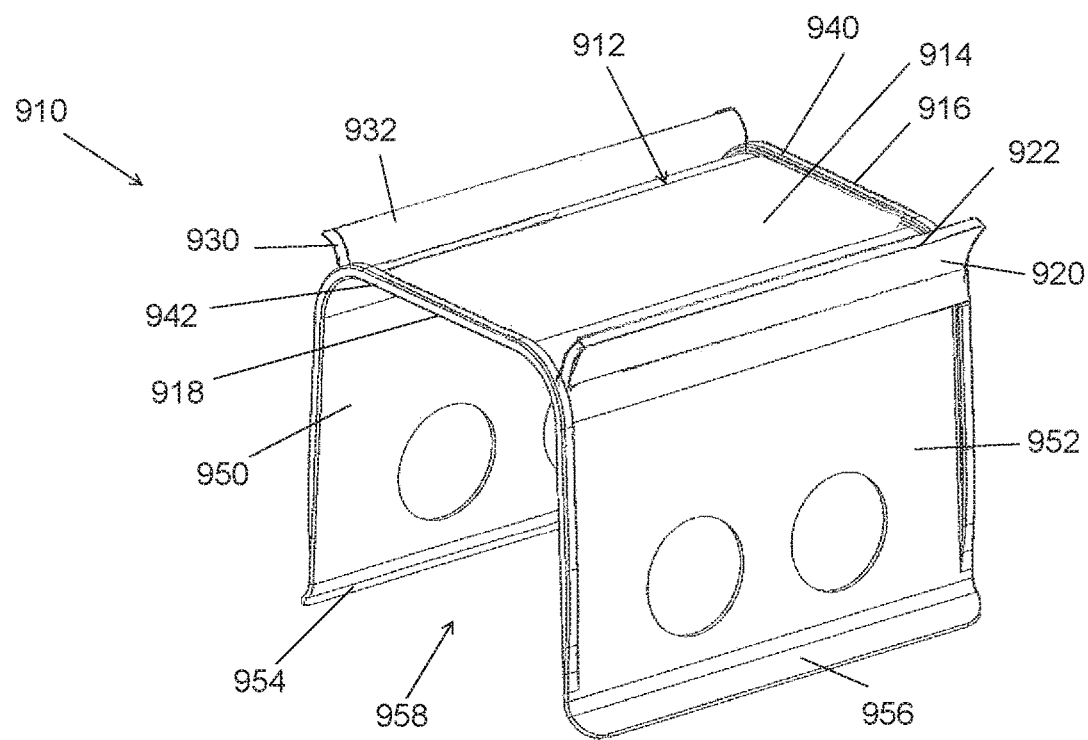
FIG. 16 is an upper front perspective view of a tenth example liner assembly for use with an axle bracket that may be used in an axle coupling assembly for coupling to an axle, similar to that shown in FIG. 6.
Figure 17:
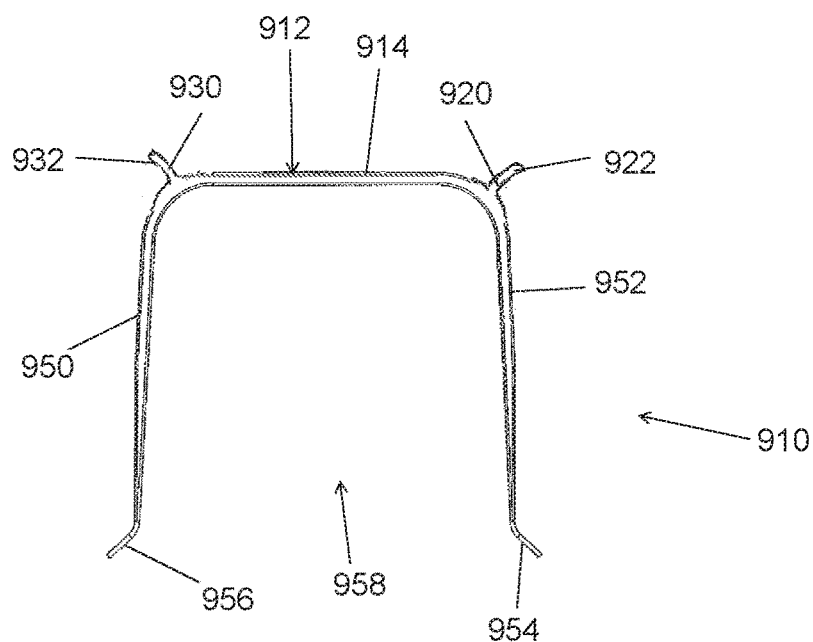
FIG. 17 is an end view of the example liner assembly of FIG. 16.

Turning to FIGS. 16-17, a tenth example liner assembly 910 for an axle bracket, such as axle bracket 72 of the first example, is shown. The liner assembly 910 has a body 912, which includes an elongated base 914 and at least one extension member 920. In this tenth example liner assembly 910, the elongated base 914 has a first end 916 and a second end 918, and the extension member 920 extends from along a side of the elongated base 914, in a generally upward and outward direction. The extension member 920 has a connector 922, which is in the shape of an elongated flange. The connector 922 may be of a tapered shape when configured for coupling to a connector receiver of an axle bracket, such as the axle bracket 72. In this instance, at least one connection receiver is provided by the side wall of one of the passages 88 through the central portion 82 of the axle bracket 72 of the first example. It will be appreciated that the connector 922 may be of various configurations, and in this instance is configured to be coupled to the axle bracket without having connectors located along an exterior surface of the axle bracket when installed on an axle 108.

The liner assembly 910 may include at least one side wall 950, and has a first end 916 and a second end 918. The connector 922 may be of a tapered shape to permit insertion but resist removal from the passage 988. It will be appreciated that the extension member 920 and connector 922 may be of various configurations so as to be complementary to passages, recesses or apertures within the connector receiver when coupling to an axle bracket, such as axle bracket 72.

In this example, the body 912 of the liner assembly 910 may further include at least a second extension member 930 that may have a connector 932 having a similar configuration but as a mirror image of the first extension member 920 and first connector 922. The second extension member 930 and connector 932 may extend from along a side of the elongated base 914, and the extension member 930 may be similar but in an opposed direction to the extension member 920. Also, the extension members 920, 930 are configured to deflect or bend when they engage an axle bracket. Indeed, the at least two extension members 920, 930 will deflect inward as the liner assembly 910 is being moved into engagement with the axle bracket.

The elongated base 914 of the body 912 of this tenth example liner assembly 910 may include a first locating member 940 having an upstanding edge or lip at the first end 916 to further assist in locating a liner assembly 910 during installation and to help keep the liner assembly in position during operation of the fully assembled suspension, similarly to the advantageous locating member 40 of the first example liner assembly 10. A further second locating member 942, similar to the second locating member 42, also may be included to further assist in providing the location and retention benefits previously described.

With the tenth example shown in FIGS. 16-17, the elongated base 914 of the body 912 of the liner assembly 910 includes the two side walls 950, 952. The two side walls 950, 952 may include distal portions 954, 956 that are flared outward relative to the side walls 950, 952 to provide the advantages noted with respect to the first example and to provide an entry to an axle receiving space 958 between the side walls 950, 952. The liner assembly 910 also may be constructed from a variety of materials and in a variety of configurations, as noted with respect to the first example liner assembly 10.

It will be appreciated when viewing FIGS. 5, 6 and 16-17 that a tenth example liner assembly and axle bracket combination is disclosed as including the aforementioned tenth example liner assembly 910 having a body 912 including an elongated base 914 that includes at least one extension member 920 that has at least one connector 922. The assembly further includes an axle bracket, such as the example axle bracket 72 of the first example, having a body having a central portion 82 and two depending flanges 84, 86 connected to the central portion 82. The central portion 82 also includes at least one passage 88 extending between the opposed ends 76, 78 of the central portion 82. The at least one passage 88 has an open side wall along a surface 90 of the central portion 82, wherein the at least one passage 88 is open to a space 92 between the depending flanges 84, 86, each of which has a connection receiver 80. With this configuration, when the connectors 922, 932 of the liner assembly 910 are received by the connector receivers of in the form of the open passages 88 of the axle bracket 72, the elongated base 914 of the liner assembly 910 extends between the depending flanges 84, 86 and adjacent the surface 90 of the central portion 82 having the open side wall of the at least one passage 88.

In the tenth example shown, it will be appreciated that the liner assembly 910 may include at least a second extension member 930 having a connector 932, and the second passage 88 of the axle bracket 72 may further act as at least a second connector receiver to receive the connector 932 on the at least second extension member 930. Indeed, the liner assembly 910 is shown with at least two extension members 920, 930 at opposed sides of the elongated base 914, and each extension member 920, 930 further includes a connector 922, 932, as described above respectively.

It will be understood when viewing FIGS. 5, 6 and 16-17 that a method of connecting a liner assembly to an axle bracket may include holding an axle bracket 72 having a body that includes a central portion 82 and at least one connector receiver in the form of a passage 88 having an open side wall, holding a liner assembly 910 having an elongated base 914 and at least one extension member 920 that includes a connector 922, and moving the liner assembly 910 to position the elongated base 914 adjacent the central portion 82 of the axle bracket 72, and wherein the connector receiver of the axle bracket 72 receives the at least one connector 922 on the liner assembly 910. Thus, as the liner assembly 910 is moved into position to be connected to the axle bracket 72, the connector 922 will engage the side wall of the passage 88 as the connector receiver of the axle bracket 72. This will force the extension member 920 to deflect until the liner assembly 910 is moved to a position wherein the passage 88 of the connector receiver receives the connector 922. The compression and retention force developed by the connector 922 during installation on the axle bracket 72 provides a self-securing feature and the connector 922 may be configured to snap or be press fit into place.

The liner assembly 910 may include at least two extension members 920, 930, with each extension member having at least one connector 922, 932, respectively, while the axle bracket 72 may include at least two connector receivers, such as is provided by the at least two passages 88. The moving of the liner assembly 910 to position the elongated base 914 of the liner assembly 910 adjacent the central portion 82 of the axle bracket 72 then permits the at least two connector receivers on the axle bracket 72 to receive the respective at least two connectors 922, 932 on the liner assembly 910. For instance, in the tenth example shown, once the connector receivers of the passages 88 receive the connectors 922, 932, the extension members 920, 930 will try to return to their relaxed state and will generate a retention force to hold the liner assembly 910 in position adjacent the central portion 82 of the axle bracket 72, and to thereafter be coupled to the axle 108.

In the tenth example shown by way of FIGS. 5, 6 and 16-17, the body of the axle bracket 72 of the liner assembly and axle bracket combination may be constructed similarly to that of the first example axle bracket 72, but optionally need not have depending flanges. As in the first example, when used in combination with the tenth example liner assembly 910, the axle bracket 72 may include at least a second passage 88 that extends between opposed ends 76, 78 of the central portion 82 of the axle bracket 72. The second passage 88 also is open to the space 92 between the depending flanges 84, 86. Further, each of the first and second passages 88 will accommodate the previously described U-shaped fastener 94 for connection within an axle coupling assembly like that shown in FIGS. 4 and 6. As noted with respect to the first example, the axle bracket 72 may be constructed of suitable materials and using suitable methods of manufacturing, as discussed with respect to the first example.

In light of the above discussion, the drawings and the attached claims, it will be appreciated that liner assemblies for axle coupling assemblies and liner assembly and axle bracket combinations in accordance with the present disclosure may be provided in various configurations. Any variety of suitable materials of construction, configurations, shapes and sizes for the components and methods of connecting the components may be utilized to meet the particular needs and requirements of an end user. It will be apparent to those skilled in the art that various modifications can be made in the design and construction of such liner assemblies and liner assembly and axle bracket combinations, and in the methods of connecting a liner assembly to an axle bracket, without departing from the scope of the attached claims, and that the claims are not limited to the examples described.

The invention claimed is:

1. A liner assembly for an axle bracket of an axle coupling assembly, comprising:
    a body further comprising an elongated base and at least one extension member comprising a connector and the body further comprising two side walls extending from the elongated base, wherein the two side walls further comprise distal portions that are flared outward relative to the side walls and provide an entry to an axle receiving space between the side walls.

2. The liner assembly of claim 1 wherein the connector further comprises a protrusion.

3. The liner assembly of claim 1 wherein the connector further comprises an aperture.

4. The liner assembly of claim 1 wherein the connector has a self-centering shape.

5. The liner assembly of claim 1 wherein the body further comprises at least a second extension member comprising a connector.

6. The liner assembly of claim 5 wherein the two extension members are located at opposed ends of the elongated base.

7. The liner assembly of claim 6 wherein the connectors further comprise protrusions that extend toward each other.

8. The liner assembly of claim 6 wherein the two extension members are configured to deflect and the connectors are configured to cause the at least two extension members to deflect in opposed directions when the liner assembly is being connected to the axle bracket.

9. The liner assembly of claim 1 wherein the elongated base includes a first locating member further comprising an upstanding edge at a first end of the elongated base.

10. The liner assembly of claim 9 wherein the elongated base includes a second locating member further comprising an upstanding edge at a second end of the elongated base.

11. The liner assembly of claim 1 wherein the two side walls extending from the elongated base extend in a direction opposite the at least one extension.

12. The liner assembly of claim 1 wherein the two side walls further comprise locating members including an upstanding edge at each end of the side walls.

13. A liner assembly and axle bracket combination, comprising:
    a liner assembly further comprising a body having an elongated base and at least one extension, with the extension further comprising at least one connector;
    the liner assembly body further comprising two side walls extending from the elongated base;
    an axle bracket further comprising a body having a central portion and at least two depending flanges that are connected to the central portion; and
    the axle bracket further comprising at least one connector receiver configured to receive the at least one connector of the at least one extension of the liner assembly; and
    wherein the two side walls of the liner assembly further comprise distal portions that are flared outward relative to the side walls and that extend beyond the depending flanges.

14. The liner assembly and axle bracket combination of claim 13 wherein the liner assembly further comprises at least a second extension member further comprising at least one connector, and the axle bracket further comprises at least a second connector receiver configured to receive the at least one connector of the at least second extension member.

15. The liner assembly and axle bracket combination of claim 14 wherein the at least two extension members of the liner assembly are configured to deflect when the liner assembly is being connected to the axle bracket.

16. The liner assembly and axle bracket combination of claim 13 wherein the central portion of the axle bracket further comprises at least one passage extending between opposed ends of the central portion;
    the at least one passage having an open side wall along a surface of the central portion, wherein the at least one passage is open to a space between the depending flanges; and
    wherein when the at least two connectors of the liner assembly are received by the respective connector receivers of the axle bracket, the elongated base of the liner assembly extends between the depending flanges and adjacent the surface of the central portion having the open side wall of the at least one passage.

17. The liner assembly and axle bracket combination of claim 16 wherein the central portion of the axle bracket further comprises at least a second passage extending between opposed ends of the central portion;
    the at least second passage having an open side wall along a surface of the central portion, wherein the at least second passage is open to the space between the depending flanges; and
    wherein the at least two connectors of the liner assembly are received by at least first and second passages.

18. The liner assembly and axle bracket combination of claim 13 wherein the liner assembly further comprises locating members including upstanding edges at the ends of the liner assembly.

19. A method of connecting a liner assembly to an axle bracket, comprising:
holding the axle bracket having a body further comprising a central portion and at least one connector receiver, and at least two depending flanges connected to the central portion;
holding the liner assembly having an elongated base, at least one extension member further comprising at least one connector and further comprises two side walls extending from the elongated base, wherein the two side walls further comprise distal portions that are flared outward relative to the side walls and provide an entry to an axle receiving space between the side walls; and
moving the liner assembly to position the elongated base adjacent the central portion of the axle bracket, and wherein the at least one connector receiver on the axle bracket receives the at least one connector on the liner assembly; and
wherein moving the liner assembly to position the elongated base adjacent the central portion of the axle bracket causes the two side walls of the liner assembly to be positioned adjacent the respective two depending flanges of the axle bracket.

20. The method of connecting a liner assembly to an axle bracket of claim 19 wherein the liner assembly further comprises at least two extension members, with each extension member further comprising at least one connector, and the axle bracket further comprises at least two connector receivers, and wherein moving the liner assembly to position the elongated base adjacent the central portion of the axle bracket causes the at least two connector receivers on the axle bracket to receive the respective at least two connectors on the liner assembly.

* * * * *